United States Patent
Ogawa

(10) Patent No.: US 7,557,587 B2
(45) Date of Patent: Jul. 7, 2009

(54) CONTROL APPARATUS, SEMICONDUCTOR INTEGRATED CIRCUIT APPARATUS, AND SOURCE VOLTAGE SUPPLY CONTROL SYSTEM

(75) Inventor: Yasushige Ogawa, Kasugai (JP)

(73) Assignee: Fujitsu Microelectronics Limited, Tokyo (JP)

( * ) Notice: Subject to any disclaimer, the term of this patent is extended or adjusted under 35 U.S.C. 154(b) by 286 days.

(21) Appl. No.: 11/723,599

(22) Filed: Mar. 21, 2007

(65) Prior Publication Data

US 2007/0170929 A1 Jul. 26, 2007

Related U.S. Application Data

(63) Continuation-in-part of application No. 11/370,888, filed on Mar. 9, 2006, now abandoned.

(30) Foreign Application Priority Data

Nov. 21, 2005 (JP) ............................. 2005-336022
Nov. 21, 2006 (JP) ............................. 2006-314739

(51) Int. Cl.
*G01R 27/02* (2006.01)
*G01R 31/02* (2006.01)
*G01R 31/26* (2006.01)

(52) U.S. Cl. ...................... 324/603; 324/763; 324/765; 327/540

(58) Field of Classification Search ................. 324/603, 324/602, 600, 765, 763, 771, 73.1, 522, 523, 324/527, 158.1; 327/143, 198, 540
See application file for complete search history.

(56) References Cited

U.S. PATENT DOCUMENTS

| 5,504,452 | A  | 4/1996 | Takenaka |
| 6,320,400 | B1 | 11/2001 | Black et al. |
| 6,377,083 | B1 | 4/2002 | Takabayashi et al. |
| 6,522,567 | B2 | 2/2003 | Iwanari |
| 6,628,135 | B2 | 9/2003 | Gauthier et al. |
| 6,961,883 | B2 | 11/2005 | Tsuji |
| 7,034,561 | B2 | 4/2006 | Farnworth et al. |
| 7,102,362 | B2 | 9/2006 | Funfrock et al. |
| 7,352,193 | B2 * | 4/2008 | Nakahara ................. 324/713 |
| 2006/0232299 | A1 | 10/2006 | Nishikawa |

FOREIGN PATENT DOCUMENTS

JP 2001-332699 A 11/2001

* cited by examiner

Primary Examiner—Timothy J Dole
Assistant Examiner—Hoai-An D Nguyen
(74) Attorney, Agent, or Firm—Arent Fox LLP

(57) ABSTRACT

An excluding unit is controlled by a control signal received from a control unit, and based on the control signal a determination is made for each of circuit blocks as to whether either a voltage signal at a position of its corresponding circuit block or a signal indicating a voltage is outputted to a selection unit. From a circuit block which is not in operation, the voltage, but not a voltage signal at a position of the circuit block, is outputted to the selection unit. By this, the circuit block which is not in operation cannot be judged to have voltage drop, and accordingly, a high supply voltage cannot be supplied. Consequently, a malfunction caused by supply voltages to other circuit blocks being too high does not occur.

24 Claims, 20 Drawing Sheets

F I G. 3
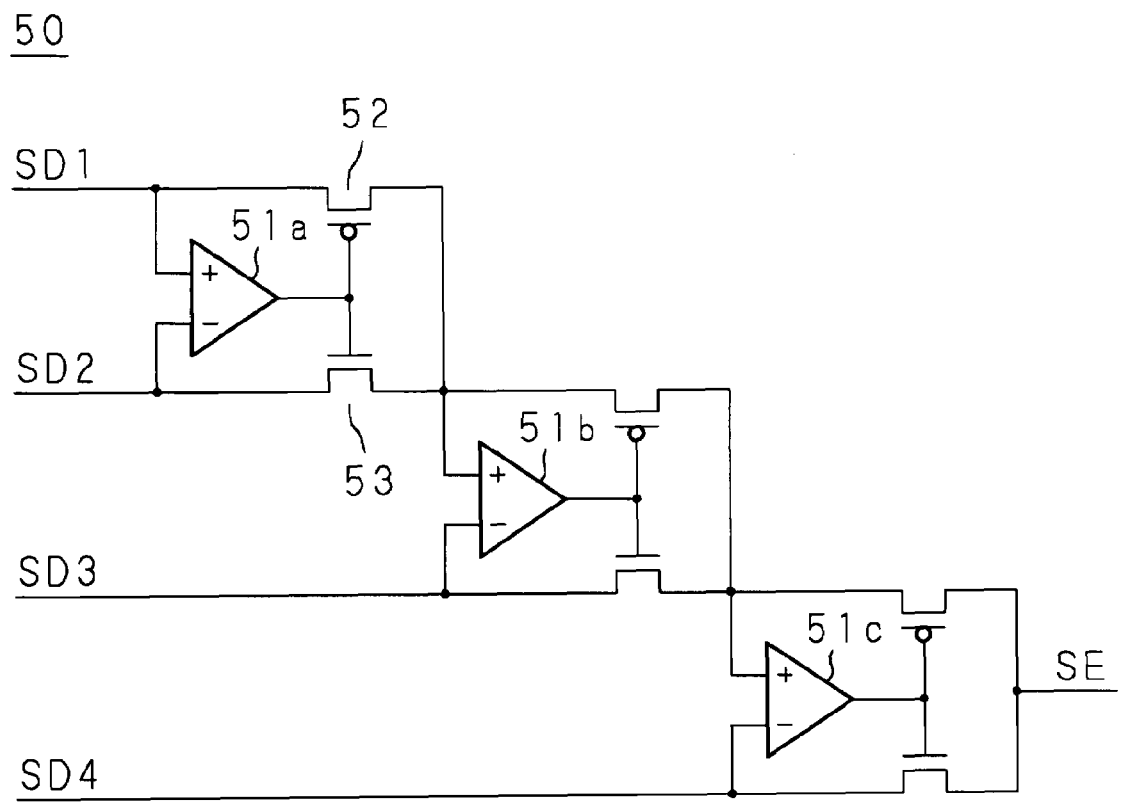

F I G. 5
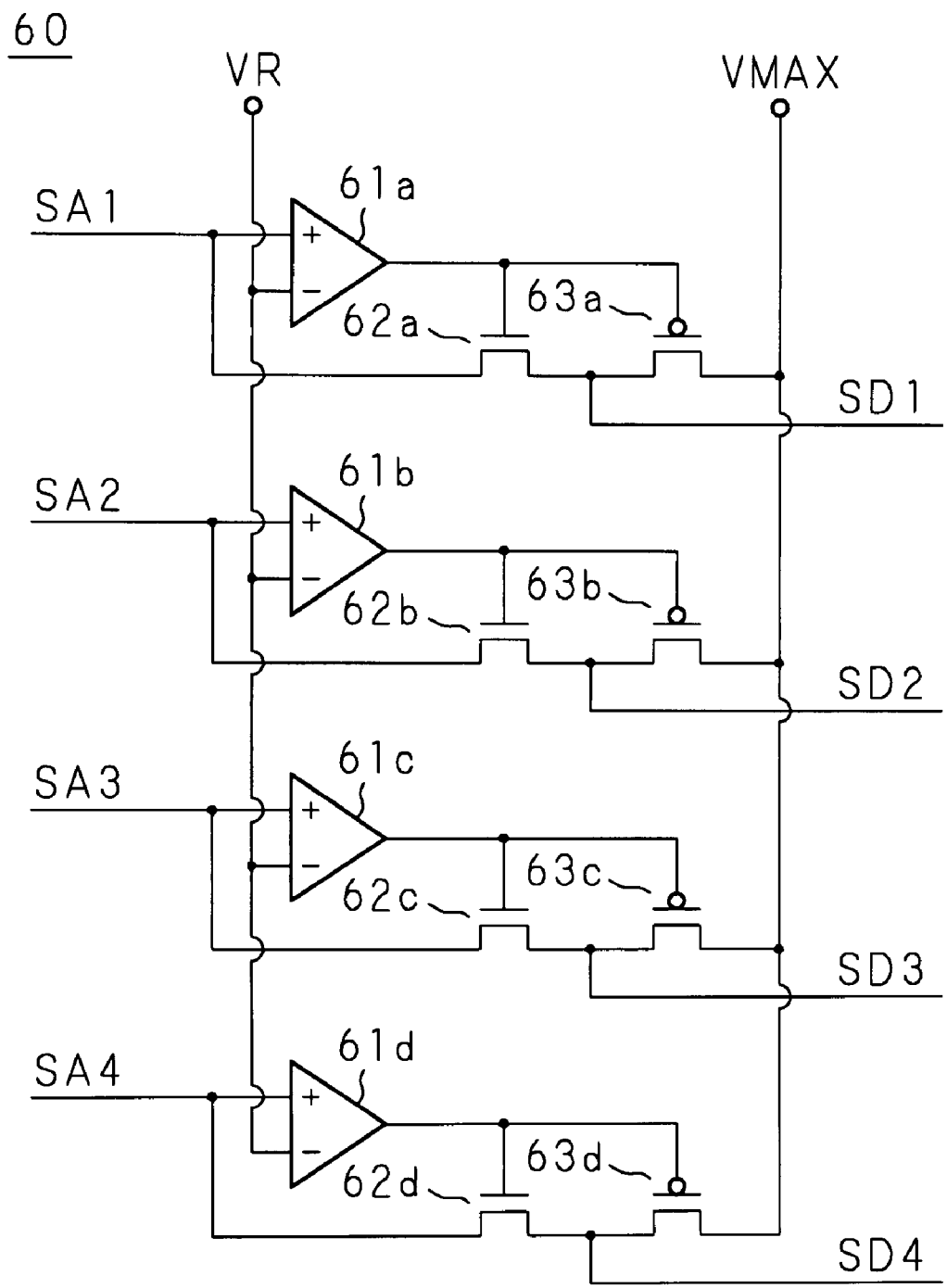

F I G. 8
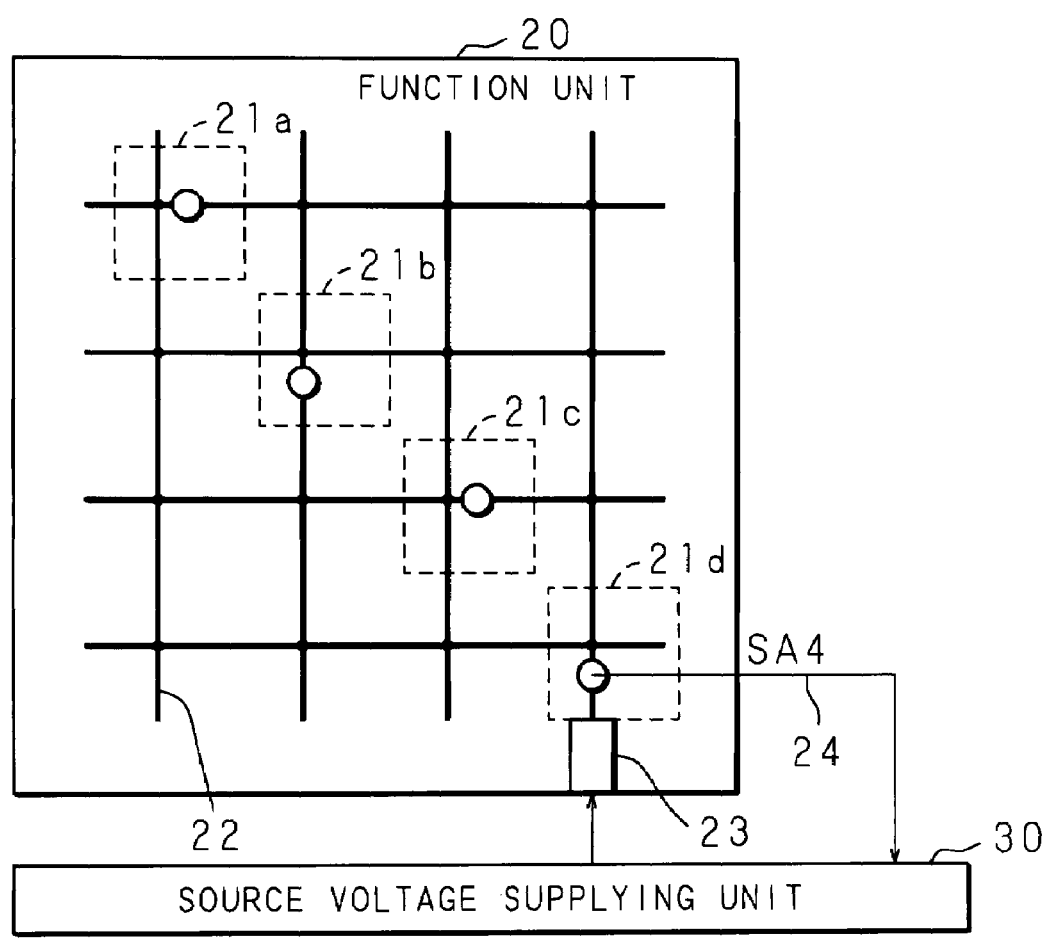

FIG. 11A

| INPUT VOLTAGE (V) | OUTPUT VALUE |
|---|---|
| 1.7 | 0 ('00') |
| 1.8 | 1 ('01') |
| 1.9 | 2 ('10') |
| 2.0 | 3 ('11') |

FIG. 11B

| INPUT VALUE | OUTPUT VOLTAGE (V) |
|---|---|
| 0 ('00') | 1.7 |
| 1 ('01') | 1.8 |
| 2 ('10') | 1.9 |
| 3 ('11') | 2.0 |

CONTROL APPARATUS, SEMICONDUCTOR INTEGRATED CIRCUIT APPARATUS, AND SOURCE VOLTAGE SUPPLY CONTROL SYSTEM

CROSS-REFERENCE TO RELATED APPLICATIONS

This is a continuation-in-part of U.S. patent application Ser. No. 11/370,888, filed on Mar. 9, 2006 now abandoned.

BACKGROUND OF THE INVENTION

1. Field of the Invention

The present invention relates to a control apparatus which detects voltages at a plurality of positions on an integrated circuit and controls a supply voltage to be supplied to the integrated circuit, based on the detected voltages. Also, the invention relates to a semiconductor integrated circuit apparatus which comprises such control apparatus. Further, the invention relates to a source voltage supply control system which supplies a voltage to such semiconductor integrated circuit apparatus.

2. Description of the Related Art

Many of the recent semiconductor integrated circuit apparatuses are large in size and have complex functionality. In addition, there are strong demands for high integration, high speed, and low voltage of an integrated circuit, and thus, problems regarding source wirings and signal wirings are becoming serious. As for source wirings, voltage drop (IR-drop) that is caused by a resistance component of a source wiring itself and upon operation of an integrated circuit affects the operating speed of the integrated circuit, and therefore, a malfunction may possibly occur. In addition, by metal atoms moving in a wiring due to transient current, electromigration that may break the wiring or may cause a short circuit with other conductors may possibly occur. The lower the voltage, the higher the ratio of the amount of voltage drop; therefore, voltage drop is one of the serious problems in the recent semiconductor integrated circuit apparatuses.

In view of this, a semiconductor integrated apparatus is proposed (see, for example, Japanese Patent Application Laid-Open No. 2001-332699) in which a voltage detection cell is disposed in an appropriate position on a source wiring of a semiconductor integrated circuit, a voltage at that position is detected, and further, voltage drop of the detected voltage is detected, whereby voltage drop on the semiconductor integrated circuit is simply and easily checked and the voltage drop can be compensated.

There is a known technique in which in order to realize low power consumption, a supply of a supply voltage to a circuit block that is not necessary in a certain operation mode is intentionally cut off. If such a technique is applied to the aforementioned technique disclosed in Japanese Patent Application Laid-Open No. 2001-332699, in spite of no voltage drop, since a voltage at one of a plurality of circuit blocks becomes 0 V, a determination that there is voltage drop is made and accordingly a high supply voltage is supplied. As a result, the supply voltages to other circuit blocks are increased, causing a problem of a malfunction. Needless to say, even if a supply of a supply voltage is not intentionally cut off, if a supply voltage to an unnecessary circuit block is reduced, the same problem occurs.

BRIEF SUMMARY OF THE INVENTION

The present invention is made in view of the foregoing problem. An object of the present invention is to provide a control apparatus, in which as in the case where a supply of a supply voltage to one circuit block is cut off, by ignoring a voltage at one of a plurality of positions on an integrated circuit, a voltage that is the cause of voltage drop on the integrated circuit is accurately grasped and compensation can be appropriately made. Also, another object of the present invention is to provide a semiconductor integrated circuit apparatus which comprises such control apparatus. Further, another object of the present invention is to provide a source voltage supply control system which supplies a voltage to such semiconductor integrated circuit apparatus.

A control apparatus according to a first aspect of the present invention is a control apparatus for detecting voltages at a plurality of positions on an integrated circuit and controlling a supply voltage to be supplied to the integrated circuit, based on the detected voltages, and is characterized by comprising: selecting means for selecting a voltage at one position of the plurality of positions; and excluding signal generating means for generating an excluding signal which excludes the voltage at one position of the plurality of positions from the selection made by the selecting means; wherein the selecting means selects a second voltage from voltages not excluded by the excluding signal, and the supply voltage to be supplied to the integrated circuit is controlled based on the second voltage selected by the selecting means.

In the control apparatus according to the first aspect of the present invention, voltages at a plurality of positions on an integrated circuit are detected and one of the detected voltages at the plurality of positions is selected. At this selection, an excluding signal is generated, and based on the generated excluding signal a voltage at the one of the plurality of positions is excluded from the selection. By this, as in the case in which a supply of a supply voltage to one circuit block is cut off, by ignoring a voltage at one of a plurality of positions on an integrated circuit, a voltage that is the cause of voltage drop on the integrated circuit is accurately grasped and compensation is appropriately made.

Hence, according to the aforementioned control apparatus according to the first aspect of the present invention, even when, in spite of no voltage drop, a voltage at a certain position is reduced, since the voltage is ignored, the position of the voltage cannot be judged to have voltage drop, and accordingly, a high supply voltage cannot be supplied. Consequently, the possibility of causing a malfunction due to supply voltages to other circuit blocks being too high is eliminated.

A control apparatus according to a second aspect of the present invention is based on the first aspect, and is characterized by further comprising identifying means for identifying the position of the voltage excluded from the selection by the selecting means, wherein the excluding signal generating means generates the excluding signal for excluding the voltage at the position identified by the identifying means.

In the control apparatus according to the second aspect of the present invention, a position that is excluded from the selection by the selecting means is identified and an excluding signal is generated based on the identified position that should be excluded.

According to the aforementioned control apparatus according to the second aspect of the present invention, a voltage at a position that should be excluded from a selection cannot be selected.

A control apparatus according to a third aspect of the present invention is base on the second aspect, and is characterized in that the identifying means identifies the position of the voltage excluded from the selection by the selecting means, based on an operation of each of the plurality of positions on the integrated circuit.

In the control apparatus according to the third aspect of the present invention, a position that should be excluded is identified based on the operation of the integrated circuit. By this, when a supply of a supply voltage to a circuit which is not in operation is cut off, a position of the circuit which is not in operation can be identified as a position that should be excluded.

According to the control apparatus according to the third aspect of the present invention, even when, in spite of no voltage drop, a voltage at a certain position is reduced, the voltage cannot be selected.

A control apparatus according to a fourth aspect of the present invention is base on the second aspect, and is characterized in that the identifying means identifies the position of the voltage excluded from the selection by the selecting means, based on results of comparison between the voltages at the plurality of positions on the integrated circuit and a reference voltage.

In the control apparatus according to the fourth aspect of the present invention, a position that should be excluded is identified based on a reference voltage.

According to the aforementioned control apparatus according to the fourth aspect of the present invention, a position where the voltage is lower than the reference voltage can be identified as a position that should be excluded.

A control apparatus according to a fifth aspect of the present invention is base on any one of the first to fourth aspects, and is characterized in that the selecting means selects a lowest voltage from the voltages not excluded by the excluding signal.

In the control apparatus according to the fifth aspect of the present invention, the lowest voltage is selected from voltages not excluded by an excluding signal at a plurality of positions. In general, the larger the amount of voltage drop the more likely a malfunction occurs, and thus, by selecting the lowest voltage from voltages not excluded at a plurality of positions, a supply voltage to be supplied to the integrated circuit is controlled based on the lowest voltage.

According to the aforementioned control apparatus according to the fifth aspect of the present invention, since in general the larger the amount of voltage drop the more likely a malfunction occurs, the lowest voltage is selected from voltages not excluded at a plurality of positions. Hence, a supply voltage to be supplied to the integrated circuit is controlled based on the lowest voltage. The selection of the lowest voltage can be made with a relatively simple circuit configuration and thus can be made with a minimum increase in cost.

The control apparatus according to the sixth aspect of the present invention is, in the second aspect, characterized in that the integrated circuit has a plurality of circuit blocks each including one of the plurality of positions, switching means for switching supply/non-supply of the voltage to each circuit block is provided, and the identifying means identifies a position of one or more circuit blocks to which the voltage is not supplied by the switching means as a position corresponding to the voltage excluded from the selection made by the selecting means.

According to the control apparatus according to the sixth aspect of the present invention, in the second aspect, when the integrated circuit is configured by a plurality of circuit blocks, the supply/non-supply of the voltage to each circuit block is switched. In addition, the selecting means selects a voltage of a predetermined position of each circuit block. Specifying the excluding position is executed according to the switched state of the supply/non-supply of the voltage of each circuit block.

According to the control apparatus in the sixth aspect of the present invention, in the second aspect, when the integrated circuit is configured by comprises the plurality of circuit blocks, the power consumption of the integrated circuit can be saved. In addition, since the position corresponding to the circuit that does not operate can be identified as the excluding position, even when the voltage at that position is lowered although there is no voltage drop, the voltage can be ignored.

A control apparatus according to the seventh aspect of the present invention is a control apparatus for detecting voltages at an optional position of each of a plurality of integrated circuits and controlling a supply voltage to be supplied to the plurality of integrated circuits, based on the detected voltages, and is characterized by comprising: selecting means for selecting a voltage among the voltages at each of the optional positions of the plurality of integrated circuits; switching means for switching supply/non-supply of the voltage to each of the plurality of integrated circuits; and excluding signal generating means for generating an excluding signal which excludes the voltage at the optional position of one or more of the plurality of integrated circuits to which voltage is not supplied by the switching means in the plurality of integrated circuits from the selection made by the selecting means; wherein the selecting means selects a second voltage from voltages not excluded by the excluding signal, and the supply voltage to be supplied to the plurality of integrated circuits is controlled based on the second voltage selected by the selecting means.

According to the control apparatus in the seventh aspect, the voltages at the plurality of predetermined positions in the integrated circuits are detected and one of the detected voltages at the plurality of positions is selected. At this time, the control signal is generated and the voltage of one position of the plurality of positions is excluded from the selection based on the generated control signal. Thus, like a case where the voltage supply to one integrated circuit is cut, when the voltage at one position in the integrated circuit is ignored, the voltage caused by the voltage drop in the system having the plurality of integrated circuits can be accurately grasped and compensated properly.

According to the control apparatus in the seventh aspect, since the voltage supply/non-supply to each integrated circuit is switched, the power consumption of the system having the plurality of integrated circuits can be saved. In addition, since the position corresponding to the circuit that does not operate can be specified as the excluding position, even when the voltage at that position is lowered although there is no voltage drop, the voltage can be ignored.

The semiconductor integrated circuit apparatus according to the eighth aspect of the present invention is characterized in that any one of control apparatus in the first to sixth aspects is arranged on the substrate in which the integrated circuit is laid out.

According to the semiconductor integrated circuit apparatus in the eighth aspect of the present invention, any one of control apparatus described above is arranged on the substrate in which the integrated circuit is laid out.

According to the semiconductor integrated circuit apparatus in the eighth aspect of the present invention, the step of connecting the integrated circuit to the control unit after the integrated circuit and the control unit have been assembled can be omitted. In addition, since one-chip design can be implemented, a superior effect such as reduction in designing time can be provided.

A source voltage supply control system according to the ninth aspect of the present invention is a source voltage supply control system and is characterized by including: a semiconductor integrated circuit apparatus comprising: a substrate on which an integrated circuit having a plurality of circuit blocks and switching means for switching supply/non-supply of a voltage to each circuit block is laid out; and control apparatus, arranged on the substrate, for detecting voltages at each of the circuit blocks of the integrated-circuit and controlling a supply voltage to be supplied to each of the circuit blocks, based on the detected voltage, comprising: selecting means for selecting a voltage of one circuit block among the plurality of circuit blocks; identifying means for identifying one or more circuit blocks to which voltage is not supplied by the switching means; and excluding signal generating means for generating an excluding signal which excludes the voltage at one or more of the plurality of circuit blocks identified by the identifying means: wherein the selecting means selects a second voltage from voltages not excluded by the excluding signal, and the supply voltage to be supplied to the integrated circuit is controlled based on the second voltage selected by the selecting means; a source voltage supplying device for supplying a voltage to the semiconductor integrated circuit apparatus; and a specifying device for giving orders to specify the switching to switching means of the control apparatus of the semiconductor integrated circuit apparatus.

According to the source voltage supply control system in the ninth aspect of the present invention, the semiconductor integrated circuit apparatus is configured such that the control apparatus according to the sixth aspect as described above is arranged on the substrate on which the integrated circuit is laid out. The source voltage supply control system is configured by the supplying device for supplying a voltage to the semiconductor integrated circuit apparatus, the specifying device for specifying the switching of the supply/non-supply of the voltage to the circuit block of the integrated circuit, and the semiconductor integrated circuit apparatus. Thus, an appropriate voltage can be supplied to the semiconductor integrated circuit apparatus.

According to the source voltage supply control system in the ninth aspect of the present invention, since the appropriate voltage can be supplied to the semiconductor integrated circuit apparatus, a defect is not generated in the circuit block and the reliability of the system can be enhanced.

The source voltage supply control system according to the tenth aspect of the present invention is, in the ninth aspect, characterized by further including: a plurality of the semiconductor integrated circuit apparatus; and a plurality of the source voltage supplying device for supplying voltage to each of the semiconductor integrated circuit apparatus, wherein the specifying device gives orders to specify switching, to the switching means of each semiconductor integrated circuit apparatus.

According to the source voltage supply control system in the tenth aspect of the present invention, in the ninth aspect, in the case where the system comprises the plurality of semiconductor integrated circuit apparatus and the plurality of supplying devices for supplying voltages to the semiconductor integrated circuit apparatus, the supply/non-supply of the voltage from the supplying device is switched by giving orders to each semiconductor integrated circuit apparatus from the specifying device.

According to the source voltage supply control system in the tenth aspect of the present invention, in the ninth aspect, since one specifying device controls the plurality of semiconductor integrated circuit apparatus, the system can be simplified as compared with the configuration in which the specifying device is provided with respect to each semiconductor integrated circuit apparatus. Therefore, the system can be miniaturized and its cost can be low.

A source voltage supply control system according to the eleventh aspect of the present invention is a source voltage supply control system and is characterized by including: a plurality of semiconductor integrated circuit apparatus on which a plurality of integrated circuits are laid out, respectively; a control apparatus for detecting voltages at an optional position of each of a plurality of integrated circuits and controlling a supply voltage to be supplied to the plurality of integrated circuits, based on the detected voltages, comprising: selecting means for selecting a voltage among the voltages at each of optional positions of the plurality of integrated circuits; switching means for switching supply/non-supply of the voltage to each of the plurality of integrated circuits; and excluding signal generating means for generating an excluding signal which excludes the voltage at the optional position of one or more of the plurality of integrated circuits to which voltage is not supplied by the switching means in the plurality of integrated circuits from the selection made by the selecting means; wherein the selecting means selects a second voltage from voltages not excluded by the excluding signal, and the supply voltage to be supplied to the plurality of integrated circuits is controlled based on the second voltage selected by the selecting means; a source voltage supplying device for supplying a voltage to the plurality of semiconductor integrated circuit apparatus; and a specifying device for giving orders to specify switching, to the switching means of the control apparatus.

According to the source voltage supply control system in the eleventh aspect of the present invention, in the case where the plurality of semiconductor integrated circuit apparatus having the integrated circuits are comprised in the system, the supplying device for supplying a voltage to each semiconductor integrated circuit apparatus, the control apparatus for controlling the supply of a voltage from the supplying device to the integrated circuit of each semiconductor integrated circuit apparatus, and the specifying device for specifying the switching of the supply/non-supply of the voltage by the control apparatus are comprised in the source voltage supply control system itself.

According to the source voltage supply control system in the eleventh aspect of the present invention, even when the plurality of semiconductor integrated circuit apparatus are provided, since it is not necessary to provide the plurality of supplying devices and the control apparatus, the hardware scale of the source voltage supply control system can be reduced. That is, as compared with the configuration in which the plurality of supplying devices and the control apparatus are provided for the plurality of semiconductor integrated circuit apparatus, the system can be simplified, so that the system can be miniaturized and its cost can be low.

The source voltage supply control system according to the twelfth aspect of the present invention is, in the ninth and tenth aspects, is characterized in that the control apparatus has intermittent signal generating means for generating an intermittent signal whose value is intermittently varied, the selecting means selects a circuit block according to the intermittent signal, and the specifying device gives orders to specify switching of generation/non-generation of the intermittent signal, to the intermittent signal generating means of the control apparatus.

According to the source voltage supply control system in the twelfth aspect of the present invention, in the ninth and tenth aspects, the intermittent signal is generated according to the order from the specifying device and the selecting means performs the selecting operation according to the intermittent signal.

According to the source voltage supply control system in the twelfth aspect of the present invention, in the ninth and tenth aspects, since the selecting means operates intermittently, the power consumption by the selecting means can be saved.

The above and further objects and features of the invention will more fully be apparent from the following detailed description with accompanying drawings.

BRIEF DESCRIPTION OF THE SEVERAL VIEWS OF THE DRAWINGS

FIG. 3 is a configuration diagram showing an exemplary specific configuration of a selection unit;

FIG. 5 is a configuration diagram showing an exemplary specific configuration of an excluding unit according to Embodiment 2 of the present invention;

FIG. 8 is a configuration diagram showing an exemplary semiconductor integrated circuit apparatus according to Embodiment 4 of the present invention;

FIG. 11A and FIG. 11B are tables showing a correspondence between input and output in an ADC and in a DAC, respectively;

DETAILED DESCRIPTION OF THE PRESENT INVENTION

The present invention will be described in detail below with reference to the drawings that show Embodiments thereof.

Embodiment 1

Figure 1:
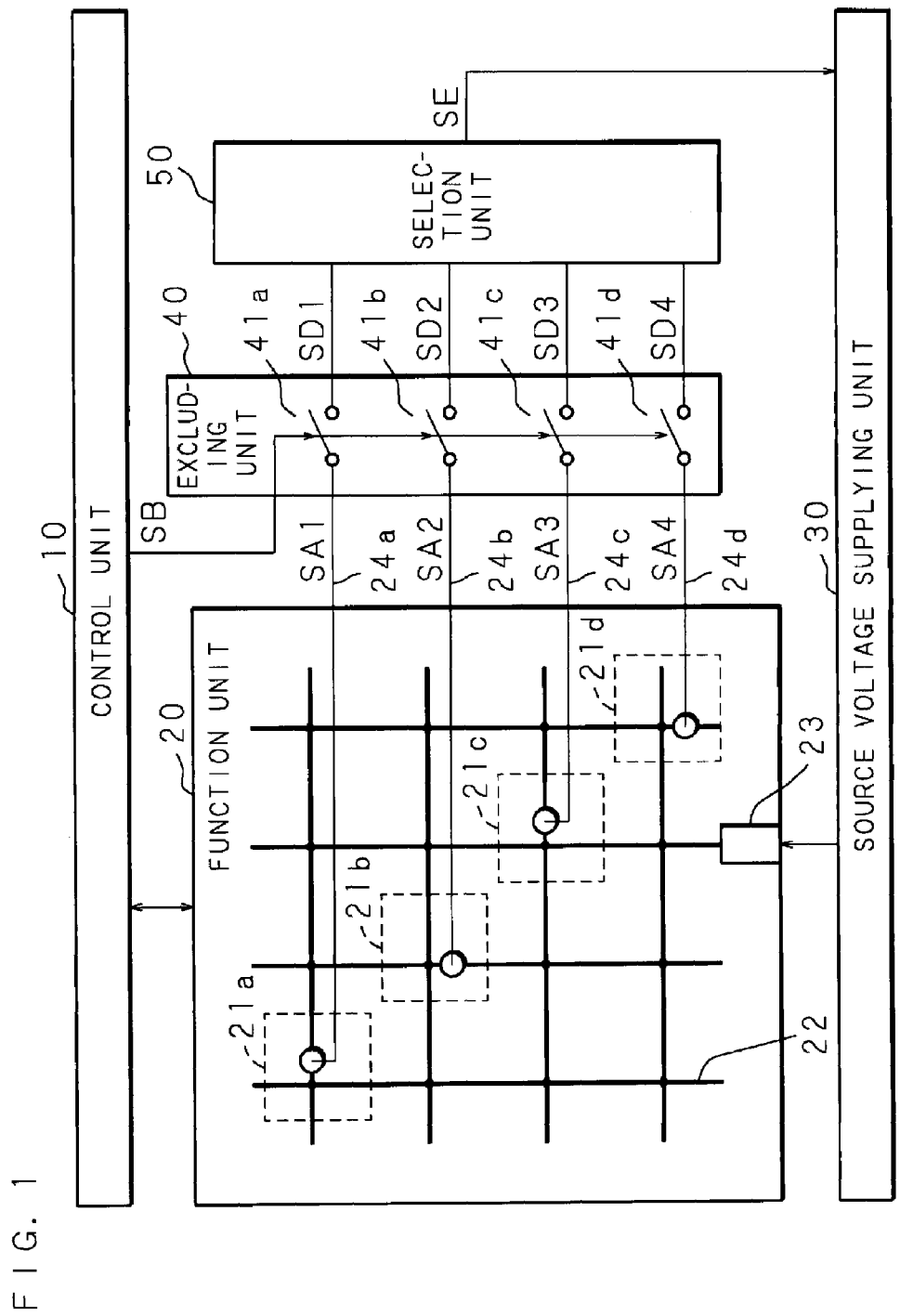
FIG. 1 is a configuration diagram showing an exemplary semiconductor integrated circuit apparatus according to Embodiment 1 of the present invention.

FIG. 1 is a configuration diagram showing an exemplary semiconductor integrated circuit apparatus according to Embodiment 1 of the present invention.

The semiconductor integrated circuit apparatus according to the Embodiment 1 includes a control unit 10, a function unit 20, a source voltage supplying unit 30, an excluding unit 40, a selection unit 50, and the like.

The function unit 20 is composed of a plurality of (e.g., four) circuit blocks 21a, 21b, 21c, and 21d. Source lines 22 for supplying a supply voltage (i.e., power source) to each of the circuit blocks 21a, 21b, 21c, and 21d are wired in a mesh pattern on the function unit 20. In the Embodiment 1, a bonding pad 23 for supplying power source is provided to the function unit 20. A voltage is supplied from the source voltage supplying unit 30 through the bonding pad 23. Leader wirings 24a, 24b, 24c, and 24d are connected to the circuit blocks 21a, 21b, 21c, and 21d, respectively. Voltages (voltage signals SA1, SA2, SA3, and SA4) at positions of their corresponding circuit blocks 21a, 21b, 21c, and 21d are outputted to outside from the function unit 20 through the leader wirings 24a, 24b, 24c, and 24d, and then inputted to the excluding unit 40.

The control unit 10 is connected to the function unit 20. The control unit 10 judges whether the circuit blocks 21a, 21b, 21c, and 21d of the function unit 20 are in operation or not. Based on the results of the judgment, the control unit 20 generates a control signal SB, into which are encoded a signal indicating a circuit block in operation as high level and a signal indicating a circuit block not in operation as low level, and outputs the control signal SB to the excluding unit 40. Whether the circuit blocks 21a, 21b, 21c, and 21c are in operation or not can be judged by, for example, operation clock frequencies inputted to the circuit blocks 21a, 21b, 21c, and 21d. The excluding unit 40 includes switches 41a, 41b, 41c, and 41d prepared for the circuit blocks 21a, 21b, 21c, and 21d, respectively. The voltage signals SA1, SA2, SA3, and SA4 are inputted to the respective one ends of the switches 41a, 41b, 41c, and 41d from the circuit blocks 21a, 21b, 21c, and 21d through the leader wirings 24a, 24b, 24c, and 24d, respectively. The ON/OFF of the switches 41a, 41b, 41c, and 41d is individually controlled based on the control signal SB.

Figure 2:
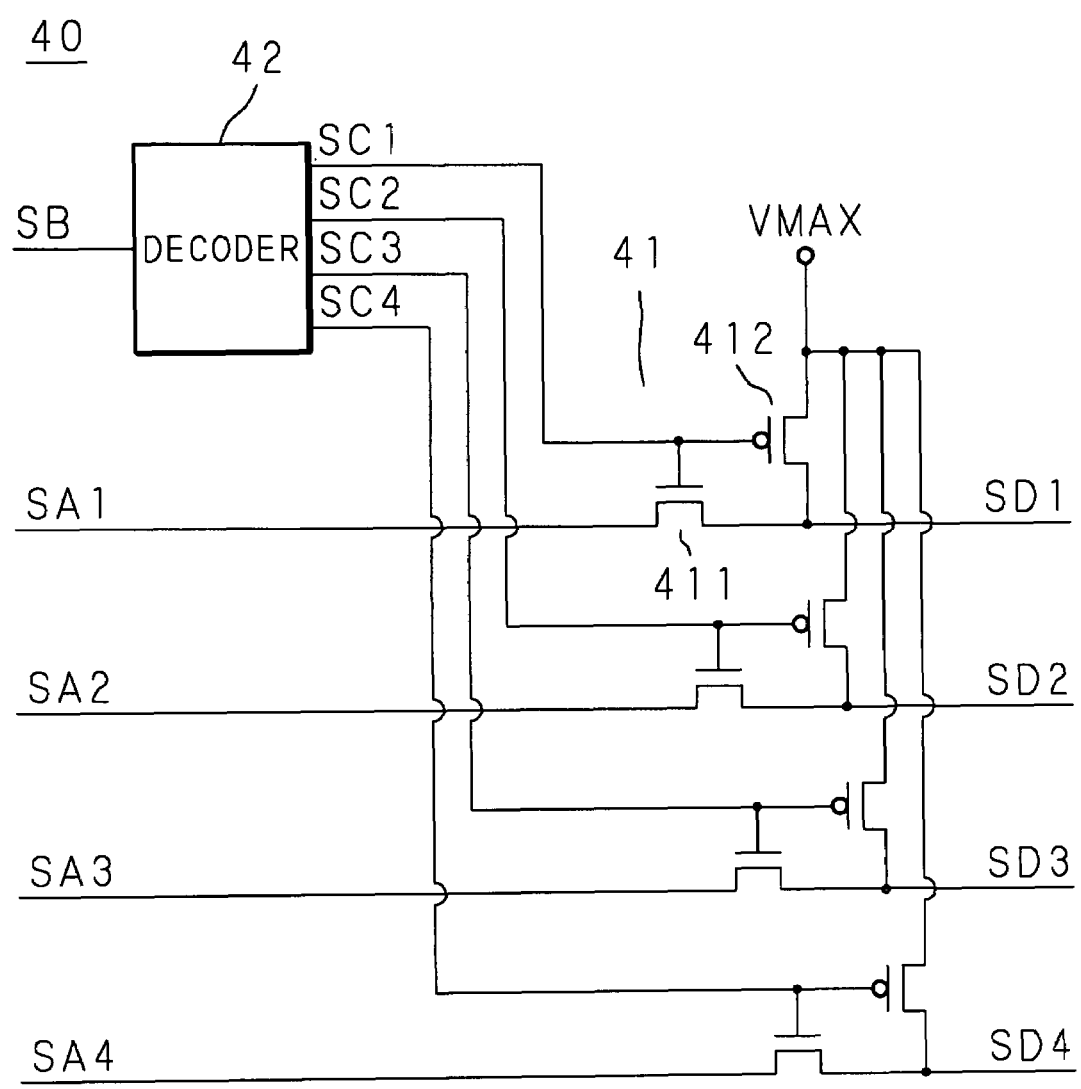
FIG. 2 is a configuration diagram showing an exemplary specific configuration of an excluding unit according to Embodiment 1 of the present invention.

FIG. 2 is a configuration diagram showing an exemplary specific configuration of the excluding unit 40 according to Embodiment 1 of the present invention. As shown in FIG. 2, the excluding unit 40 includes a decoder 42 for outputting control signals SC1, SC2, SC3, and SC4 that correspond to the leader wirings 24a, 24b, 24c, and 24d, respectively by decoding a control signal SB; and four switches 41 (41a, 41b, and 41c) each composed of an N-channel transistor 411 and a P-channel transistor 412. Voltage signals SA (SA1, SA2, SA3, and SA4) are inputted to sources of their corresponding N-channel transistors 411 and a voltage VMAX is applied to a source of each P-channel transistor 412. The voltage VMAX is being supplied at all times from the source voltage supplying unit 30 and is higher than a supply voltage supplied to each of the circuit blocks 21a, 21b, 21c, and 21d.

The control signals SC (SC1, SC2, SC3, and SC4) are inputted to gates of their corresponding transistors 411 and 412. Therefore, when the control signals SC (SC1, SC2, SC3, and SC4) are high level, the N-channel transistors 411 are in an ON state and the P-channel transistors 412 are in an OFF state. In this case, signals on the source side of the N-channel transistors 411, i.e., the voltage signals SA (SA1, SA2, SA3, and SA4) on the circuit blocks 21 (21a, 21b, 21c, and 21d) are outputted as signals SD1, SD2, SD3, and SD4 to the selection unit 50 from the excluding unit 40. In addition, the signal SD (SD1, SD2, SD3, and SD4) functions as an excluding signal.

On the other hand, when the control signals SC (SC1, SC2, SC3, and SC4) are low level (when not in operation), the N-channel transistors 411 are in an OFF state and the P-channel transistors 412 are in an ON state. In this case, signals on the source side of the P-channel transistors 412, i.e., the voltage VMAX, are outputted as signals SD1, SD2, SD3, and SD4 to the selection unit 50 from the excluding unit 40.

In this manner, in the excluding unit 40, the switches 41a, 41b, 41c, and 41d are individually controlled by signals which is decoded a control signal SB received from the control unit 10. Based on the control signal SB, a determination is made for each of the circuit blocks 21a, 21b, 21c, and 21d as to whether either a voltage signal SA1, SA2, SA3, or SA4 at a position of its corresponding circuit block 21a, 21b, 21c, or 21d or a voltage signal indicating the voltage VMAX is outputted as a signal SD1, SD2, SD3, or SD4 to the selection unit 50. In other words, when any of the circuit blocks 21a, 21b, 21c, and 21d is not in operation, the voltage MAX, but not a voltage signal SA1, SA2, SA3, or SA4 at a position of the circuit block not in operation, is outputted as a signal SD1, SD2, SD3, or SD4 to the selection unit 50.

The selection unit 50 selects one of the signals SD1, SD2, SD3, and SD4 outputted from the excluding unit 40, based on a predetermined condition. For example, the voltage of the signal SD1 is, as described above, either the voltage of the voltage signal SA1 or the voltage VMAX, the determination of which is made by a control signal SB that is encoded based on whether the circuit blocks 21a, 21b, 21c, and 21d are in operation or not.

FIG. 3 is a configuration diagram showing an exemplary specific configuration of the selection unit 50. In the selection unit 50, for example, as shown in FIG. 3, the voltages of signals SD1, SD2, SD3, and SD4 are compared using comparators 51a, 51b, and 51c and a signal of the lowest voltage is selected from the signals SD1, SD2, SD3, and SD4 as a predetermined condition signal. The signal SD1 is inputted to a plus terminal of the comparator 51a and the signal SD2 is inputted to a minus terminal of the same. Each of the comparators 51a, 51b, and 51c outputs a high level signal when a signal inputted to the plus terminal exceeds a signal inputted to the minus terminal; otherwise, each of the comparators 51a, 51b, and 51c outputs a low level signal.

As described above, based on the levels of signals outputted from the comparators 51a, 51b, and 51c, a determination can be made as to which one of signals inputted to the plus and minus terminals of the comparators is of a lower voltage. Accordingly, based on an output signal from the comparator 51a, a P-channel transistor 52 and an N-channel transistor 53 cooperatively select a signal of a lower voltage.

Specifically, when the voltage of the signal SD1 is lower than or equal to the voltage of the signal SD2 (SD1≦SD2), an output signal from the comparator 51a is low level. As a result, the P-channel transistor 52 goes into an ON state and the N-channel transistor 53 goes into an OFF state; therefore, the signal SD1 connected to the P-channel transistor is selected.

On the other hand, when the voltage of the signal SD1 exceeds the voltage of the signal SD2 (SD1>SD2), an output signal from the comparator 51a is high level. As a result, the P-channel transistor 52 goes into an OFF state and the N-channel transistor 53 goes into an ON state; therefore, the signal SD2 connected to the N-channel transistor 53 is selected.

In a likewise manner, a comparison is made between a voltage of either signal SD1 or SD2 having a lower voltage than the other and a voltage of the signal SD3, and a signal of a lower voltage is selected. Furthermore, a comparison is made between the voltage of the selected signal and a voltage of the signal D4 and a signal of a lower voltage is selected. In this manner, the selection unit 50 selects a signal of the lowest voltage from a plurality of signals SD1, SD2, SD3, and SD4 and outputs the selected signal as a signal SE.

The signal SE selected by the selection unit 50 is inputted to the source voltage supplying unit 30. The source voltage supplying unit 30 has stored therein a reference table in which signal levels (voltage values) of the signal SE are associated with voltage values to be outputted. Thus, the source voltage supplying unit 30 determines a voltage to be outputted, based on the signal level of the signal SE and supplies the determined voltage to the function unit 20 through the bonding pad 23. That is, the source voltage supplying unit 30 feedback controls a voltage to be supplied to the function unit 20, based on the signal SE.

As described above, in the Embodiment 1, when any of control signals SC1, SC2, SC3, and SC4 is low level, the voltage VMAX, but not a voltage signal at a position corresponding to the control signal, is outputted to the selection unit 50, and therefore, the voltage signal at the corresponding position cannot be selected by the selection unit 50. Hence, any of the circuit blocks 21a, 21b, 21c, and 21d which is not in operation cannot be judged to have voltage drop, and accordingly, a high supply voltage cannot be supplied; therefore, a malfunction caused by supply voltages to other circuit blocks being too high does not occur.

Embodiment 2

In the above-described Embodiment 1, a control signal SB is provided to the excluding unit 40 from the control unit 10, whereby from a circuit block which is not in operation the voltage VMAX, but not any of voltage signals SA1, SA2, SA3, and SA4 at a position corresponding to the circuit block, is outputted to the selection unit 50. Consequently, the voltage signal at the position corresponding to the circuit block which is not in operation cannot be selected. However, since a control signal SB from the control unit 10 is not an indispensable element, Embodiment 2 that does not use a control signal SB will be described below.

Figure 4:
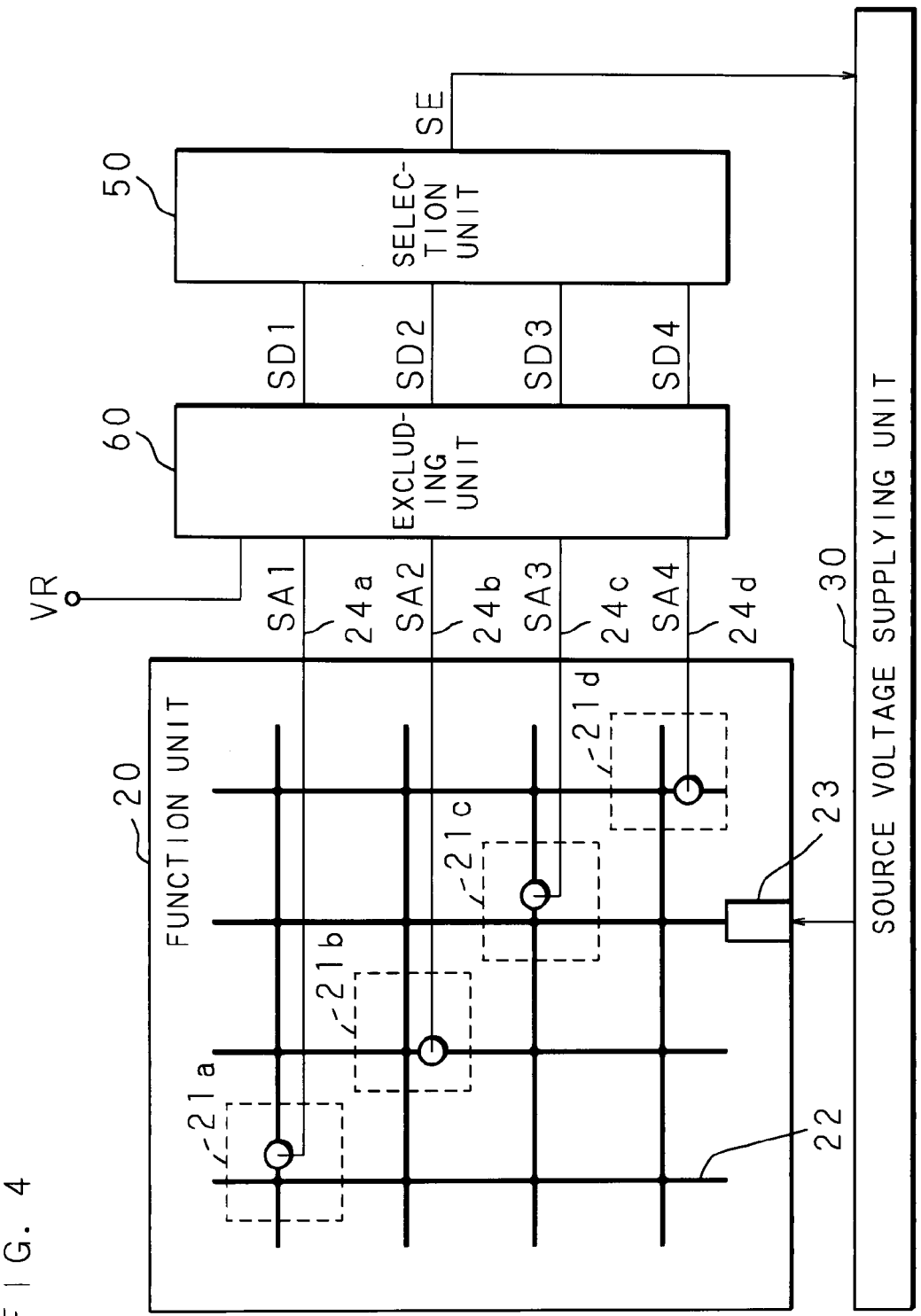
FIG. 4 is a configuration diagram showing an exemplary semiconductor integrated circuit apparatus according to Embodiment 2 of the present invention.

FIG. 4 is a configuration diagram showing an exemplary semiconductor integrated circuit apparatus according to Embodiment 2 of the present invention.

The semiconductor integrated circuit apparatus according to the Embodiment 2 includes a function unit 20, a source voltage supplying unit 30, an excluding unit 60, a selection unit 50, and the like.

Voltage signals SA1, SA2, SA3, and SA4 are inputted to the excluding unit 60, which is the same as that described in the foregoing Embodiment 1; however, here, a reference voltage signal VR is inputted to the excluding unit 60 instead of a control signal SB. When the voltage signals SA1, SA2, SA3, and SA4 each having a higher voltage than the reference voltage signal VR are inputted, the excluding unit 60 outputs the inputted voltage signals SA1, SA2, SA3, and SA4 as they are, and when signals having a lower voltage than the reference voltage signal VR are inputted, the excluding unit 60 outputs a voltage VMAX.

FIG. 5 is a configuration diagram showing an exemplary specific configuration of the excluding unit 60 according to Embodiment 2 of the present invention. More specifically, as shown in FIG. 5, the excluding unit 60 compares each of voltage signals SA1, SA2, SA3, and SA4 with a reference voltage signal VR using comparators 61a, 61b, 61c, and 61d. The voltage signals SA1, SA2, SA3, and SA4 are inputted to plus terminals of their corresponding comparators 61a, 61b, 61c, and 61d and the reference voltage signal VR is inputted to minus terminals of all the comparators. Each of the comparators 61a, 61b, 61c, and 61d outputs a high level signal when the voltage of a signal inputted to the plus terminal exceeds the voltage of a signal inputted to the minus terminal; otherwise, each of the comparators 61a, 61b, 61c, and 61d outputs a low level signal.

By this, based on the levels of signals outputted from the comparators 61a, 61b, 61c, and 61d, a judgment can be made as to which one of signals inputted to the plus and minus terminals of the comparators 61a, 61b, 61c, and 61d is of a lower voltage. Accordingly, based on an output signal from the comparator 61a (61b, 61c, or 61d), an N-channel transistor 62a (62b, 62c, or 62d) and a P-channel transistor 63a (63b, 63c, or 63d) cooperatively select an output signal of a lower voltage.

Specifically, when the voltage of the voltage signal SA1 (SA2, SA3, or SA4) exceeds the reference voltage signal VR (SA1 (SA2, SA3, or SA4)>VR), an output signal from the comparator 61a (61b, 61c, or 61d) becomes high level. As a result, the N-channel transistor 62 goes into an ON state and the P-channel transistor 63 goes into an OFF state; therefore, the voltage signal SA1 (SA2, SA3, or SA4) connected to the N-channel transistor 62 is selected.

On the other hand, when the voltage of the voltage signal SA1 (SA2, SA3, or SA4) is lower than or equal to the voltage of the reference voltage signal VR (SA1 (SA2, SA3, or SA4)≦VR), an output signal from the comparator 61a (61b, 61c, or 61d) becomes low level. As a result, the N-channel transistor 62 goes into an OFF state and the P-channel transistor 63 goes into an ON state; therefore, the voltage VMAX connected to the P-channel transistor 63 is selected. Other configurations are the same as those in Embodiment 1, and thus, corresponding portions are denoted by the same reference numerals and a detail description thereof is omitted.

As described above, in the Embodiment 2, when the voltage of any of voltage signals SA1, SA2, SA3, and SA4 is lower than or equal to the voltage of the reference voltage signal VR, the voltage VMAX, but not a voltage signal at a position corresponding to the voltage signal, is outputted to the selection unit 50, and therefore, the voltage signal at the corresponding position cannot be selected by the selection unit 50. Hence, any of the circuit blocks 21a, 21b, 21c, and 21d which is not in operation cannot be judged to have voltage drop, and accordingly, a high supply voltage cannot be supplied; therefore, a malfunction caused by supply voltages to other circuit blocks being too high does not occur. In other words, when the voltage signal outputted from a circuit block is intentionally set to a low level, such as when a circuit block is transitioned to a standby mode, the voltage of each of the voltage signals SA1, SA2, SA3, and SA4 is compared with the voltage of the reference voltage signal VR. As a result, the voltage signal SA1, SA2, SA3, or SA4 having voltage lower than the voltage of the reference voltage signal VR is excluded.

Embodiment 3

The above-described Embodiments 1 and 2 describe a configuration in which one voltage is outputted from the source voltage supplying unit 30. The present invention can also be applied to a configuration in which a plurality of voltages are outputted from a source voltage supplying unit. Embodiment 3 using such a configuration will be described below.

Figure 6:
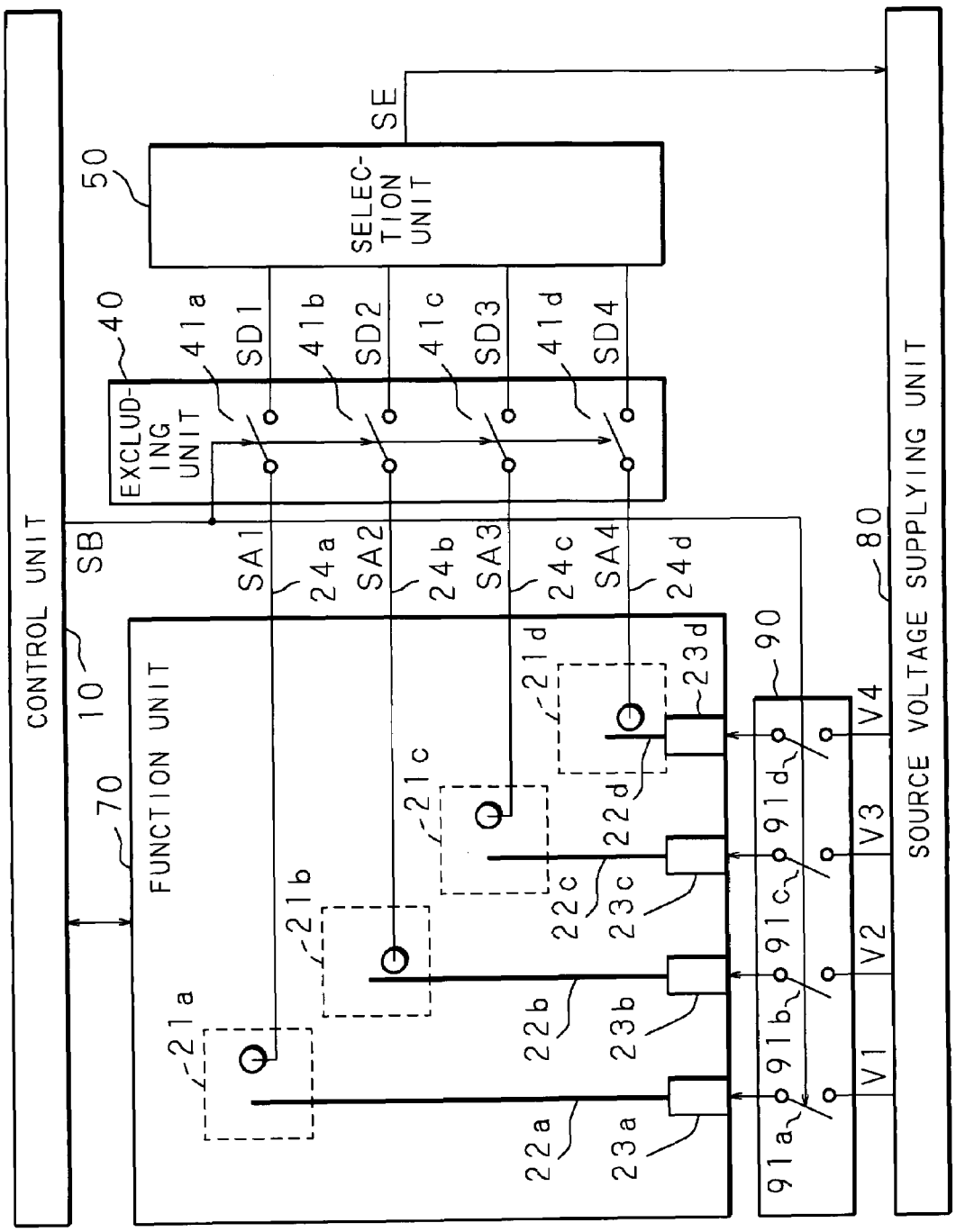
FIG. 6 is a configuration diagram showing an exemplary semiconductor integrated circuit apparatus according to Embodiment 3 of the present invention.

FIG. 6 is a configuration diagram showing an exemplary semiconductor integrated circuit apparatus according to Embodiment 3 of the present invention.

The semiconductor integrated circuit apparatus according to the Embodiment 3 includes a control unit 10, a function unit 70, a source voltage supplying unit 80, an excluding unit 40, a selection unit 50, a source switching unit 90, and the like.

The function unit 70 is composed of a plurality of circuit blocks 21a, 21b, 21c, and 21d. Source lines 22a, 22b, 22c, and 22d for individually supplying supply voltages to the circuit blocks 21a, 21b, 21c, and 21d are wired on the function unit 70. In a peripheral portion of the function unit 70, there are provided bonding pads 23a, 23b, 23c, and 23d connected to the source lines 22a, 22b, 22c, and 22d, respectively. Different voltages V1, V2, V3, and V4 are supplied to each of the bonding pads 23a, 23b, 23c, and 23d from the source voltage supplying unit 80 through the source switching unit 90.

The source switching unit 90 includes switches 91a, 91b, 91c, and 91d prepared for the circuit blocks 21a, 21b, 21c, and 21d, respectively. The voltages V1, V2, V3, and V4 to be supplied to the circuit blocks 21a, 21b, 21c, and 21d, respectively, are inputted to the respective one ends of the switches 91a, 91b, 91c, and 91d. The ON/OFF of the switches 91a, 91b, 91c, and 91d is individually controlled based on a control signal SB. Note that the control signal SB is the same as a control signal SB inputted to the excluding unit 40 in Embodiment 1; in the Embodiment 3 too, the control signal SB is inputted to the excluding unit 40.

Figure 7:
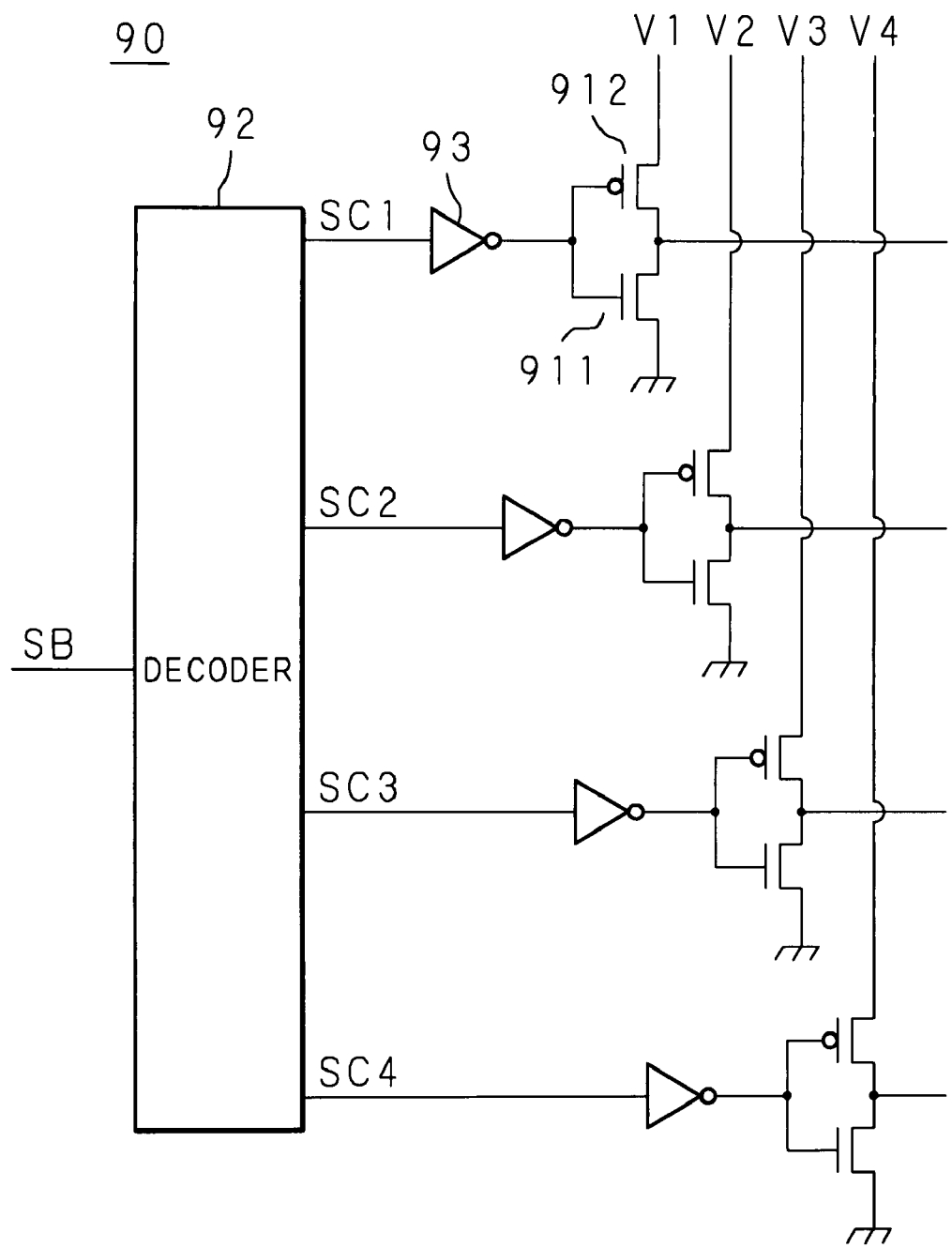
FIG. 7 is a configuration diagram showing an exemplary specific configuration of a source switching unit.

FIG. 7 is a configuration diagram showing an exemplary specific configuration of the source switching unit 90. More specifically, as shown in FIG. 7, the source switching unit 90 includes a decoder 92, switches 91a, 91b, 91c, and 91d each composed of an N-channel transistor 911 and a P-channel transistor 912, and inverters 93 each of which is connected between the decoder 92 and each switches 91a, 91b, 91c, respectively. The decoder 92 decodes a control signal SB into control signals SC1, SC2, SC3, and SC4 corresponding to leader wirings 24a, 24b, 24c, and 24d, respectively. Each inverter 93 provides an inverted signal obtained by inverting the control signal SC1 (SC2, SC3, or SC4), to gates of its corresponding N-channel transistor 911 and P-channel transistor 912.

A voltage V1 (V2, V3, or V4) is inputted to a source of the P-channel transistor 912 from the source voltage supplying unit 80 and a source of each N-channel transistor 911 is grounded. Hence, when the control signal SC1 (SC2, SC3, or SC4) is high level, that is, when an inverted signal outputted from the inverter 93 is low level, the P-channel transistor 912 goes into an ON state and the N-channel transistor 911 goes into an OFF state; therefore, a signal on the source side of the P-channel transistor 912, i.e., the voltage V1 (V2, V3, or V4), is outputted to the bonding pad 23a (23b, 23c, or 23d).

On the other hand, when the control signal SC1 (SC2, SC3, or SC4) is low level, that is, when an inverted signal outputted from the inverter 93 is high level, the P-channel transistor 912 goes into an OFF state and the N-channel transistor 911 goes into an ON state; therefore, a signal on the source side of the N-channel transistor 911, i.e., 0 V, is outputted to the bonding pad 23a (23b, 23c, or 23d).

In this manner, in the source switching unit 90, the switches 91a, 91b, 91c, and 91d are individually controlled by signals which is decoded a control signal SB received from the control unit 10, and whether to supply a voltage to the circuit blocks 21a, 21b, 21c, and 21d or not is selected based on whether the signals into which the control signal SB is decoded is valid (high level). By providing the source switching unit 90, appropriate voltages V1, V2, V3, and V4 can be individually supplied to the circuit blocks 21a, 21b, 21c, and 21d from the source voltage supplying unit 80. Other configurations are the same as those in Embodiment 1, and thus, corresponding portions are denoted by the same reference numerals and a detail description thereof is omitted.

Embodiment 4

The above-described Embodiments 1, 2, and 3 describe the case in which circuit blocks are freely disposed on the function unit 20 regardless of the level of voltage drop. Voltage drop caused by a source wiring is larger at a position where the length of a source wiring is long, such as a central portion of a board (chip). Thus, it is preferred that a circuit block whose operating margin relative to a supply voltage is the lowest be disposed at a peripheral portion of the chip, i.e., in the vicinity of a source voltage supplying unit. Embodiment 4 having such a configuration will be described below.

FIG. 8 is a configuration diagram showing an exemplary semiconductor integrated circuit apparatus according to Embodiment 4 of the present invention.

The semiconductor integrated circuit apparatus according to the Embodiment 4 includes a function unit 20, a source voltage supplying unit 30, and the like. The function unit 20 is composed of a plurality of circuit blocks 21a, 21b, 21c, and 21d. Source lines 22 for supplying power source to the circuit blocks 21a, 21b, 21c, and 21d are wired in a mesh pattern on the function unit 20. The source voltage supplying unit 30 is disposed on the periphery of the function unit 20.

For example, when, based on the individual designs of the circuit blocks 21a, 21b, 21c, and 21d, the operating margin of the circuit block 21d is found to be the lowest among the circuit blocks 21a, 21b, 21c, and 21d, the circuit block 21d is disposed in the peripheral portion of the chip. Furthermore, a bonding pad 23 for supplying power source is provided in the vicinity of a position where the circuit block 21d is disposed. A voltage is supplied to the circuit blocks 21a, 21b, 21c, and 21d from the source voltage supplying unit 30 through the bonding pad 23 and the source lines 22.

Furthermore, a leader wiring 24 is connected to the circuit block 21d. A voltage (voltage signal SA4) at a position of the circuit block 21d is outputted to the source voltage supplying unit 30 through the leader wiring 24. The source voltage supplying unit 30 feedback controls a voltage to be supplied to the function unit 20, based on the voltage signal SA4.

Note that a determination as to which one of the circuit blocks 21a, 21b, 21c, and 21d has the lowest operating margin can be made based on simulation results by a simulator that is used at the stage of individually designing the circuit blocks.

As described above, in the Embodiment 4, in view of the fact that when the operating margin of a circuit block relative to a supply voltage is low, due to voltage drop caused by a resistance component of a source wiring, the circuit block deviates from the operating margin and goes out of operation, a configuration is employed in which at least the circuit block 21d whose operating margin relative to a supply voltage is the lowest is disposed in the peripheral portion of the chip. By such a configuration, as compared with the case in which such a circuit block is disposed in the center of the chip, voltage drop on a source line 22 with respect to the circuit block 21d can be suppressed, making it possible to prevent occurrence of a malfunction.

Embodiment 5

The above-described Embodiment 4 is configured so as to shorten the length of the source wiring by disposing, in the peripheral portion of the chip, a circuit block that causes a malfunction due to voltage drop on a source line, whereby occurrence of a malfunction is suppressed. A voltage, however, may be supplied from a source voltage supplying unit to a position where a circuit block that causes a malfunction due to voltage drop on a source line is disposed. Embodiment 5 having such a configuration will be described below.

Figure 9:
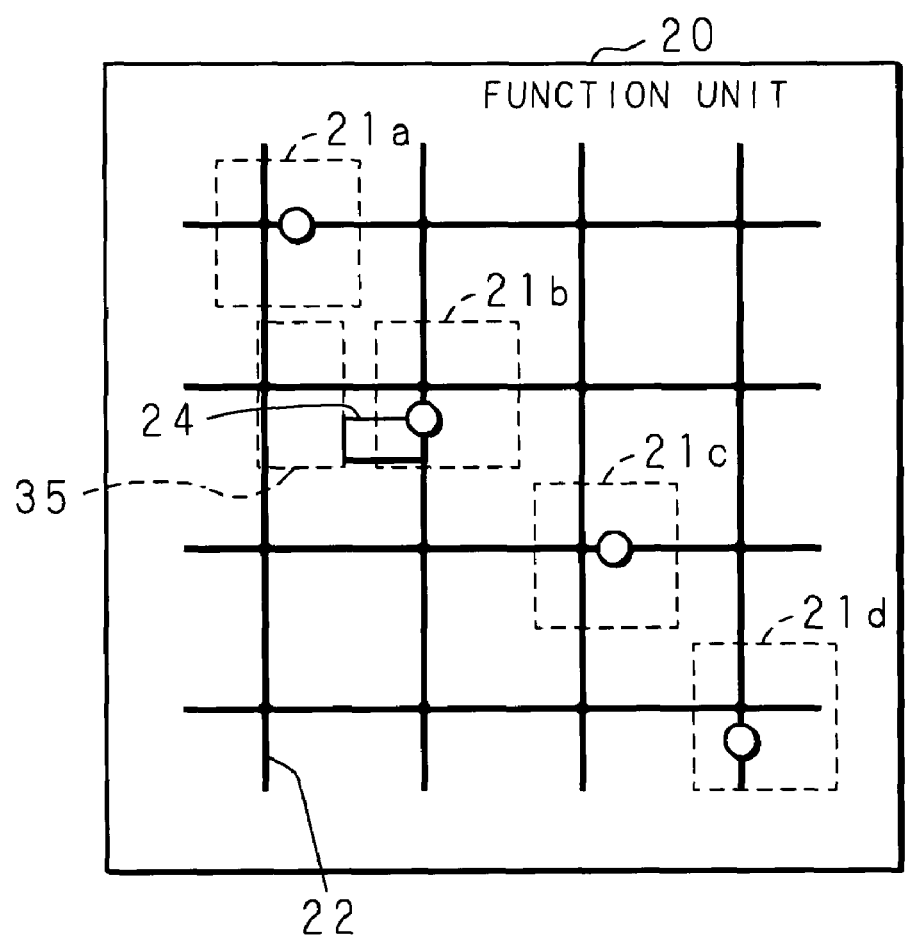
FIG. 9 is a configuration diagram showing an exemplary semiconductor integrated circuit apparatus according to Embodiment 5 of the present invention.

FIG. 9 is a configuration diagram showing an exemplary semiconductor integrated circuit apparatus according to Embodiment 5 of the present invention.

The semiconductor integrated circuit apparatus according to the Embodiment 5 includes a function unit 20, a source voltage supplying unit 35, and the like. The function unit 20 is composed of a plurality of circuit blocks 21a, 21b, 21c, and 21d. Source lines 22 for supplying a supply voltage to each of the circuit blocks 21a, 21b, 21c, and 21d are wired in a mesh pattern on the function unit 20.

When a voltage at the position of the circuit block 21b is the lowest among the circuit blocks 21a, 21b, 21c, and 21d, the source voltage supplying unit 35 is disposed nearest the position where the circuit block 21b is disposed. A voltage is supplied to each of the circuit blocks 21a, 21b, 21c, and 21d from the source voltage supplying unit 35 through the source lines 22. A determination as to which voltage at a position of any of the circuit blocks 21a, 21b, 21c, and 21d is the lowest can be made by obtaining a current consumption distribution by a well known simulation technique and grasping from the current consumption distribution a position where the amount of voltage drop is largest. Note that the disposition of a malfunction is suppressed. A voltage, however, may be supplied from a source voltage supplying unit to a position where a circuit block that causes a malfunction due to voltage drop on a source line is disposed. Embodiment 5 having such a configuration will be described below.

FIG. 9 is a configuration diagram showing an exemplary semiconductor integrated circuit apparatus according to Embodiment 5 of the present invention.

The semiconductor integrated circuit apparatus according to the Embodiment 5 includes a function unit 20, a source voltage supplying unit 35, and the like. The function unit 20 is composed of a plurality of circuit blocks 21a, 21b, 21c, and 21d. Source lines 22 for supplying a supply voltage to each of the circuit blocks 21a, 21b, 21c, and 21d are wired in a mesh pattern on the function unit 20.

When a voltage at the position of the circuit block 21b is the lowest among the circuit blocks 21a, 21b, 21c, and 21d, the source voltage supplying unit 35 is disposed nearest the position where the circuit block 21b is disposed. A voltage is supplied to each of the circuit blocks 21a, 21b, 21c, and 21d from the source voltage supplying unit 35 through the source lines 22. A determination as to which voltage at a position of any of the circuit blocks 21a, 21b, 21c, and 21d is the lowest can be made by obtaining a current consumption distribution by a well known simulation technique and grasping from the current consumption distribution a position where the amount of voltage drop is largest. Note that the disposition of the source voltage supplying unit 35 may be done by means of wire bonding or flip chip bonding.

Furthermore, a leader wiring 24 is connected to the circuit block 21b. A voltage (voltage signal) at a position of the circuit block 21b is outputted to the source voltage supplying unit 35 through the leader wiring 24. The source voltage supplying unit 35 feedback controls a voltage to be supplied to the function unit 20, based on the voltage signal inputted from the circuit block 21b through the leader wiring 24.

As described above, in the Embodiment 5, since the source voltage supplying unit 35 is disposed in the vicinity of the position where the circuit block 21b having the lowest voltage is disposed, in other words, in the vicinity of the position where the circuit block 21b having the largest amount of voltage drop is disposed, voltage drop on a source line 22 with respect to the circuit block 21b can be suppressed, making it possible to prevent occurrence of a malfunction.

Figure 10:
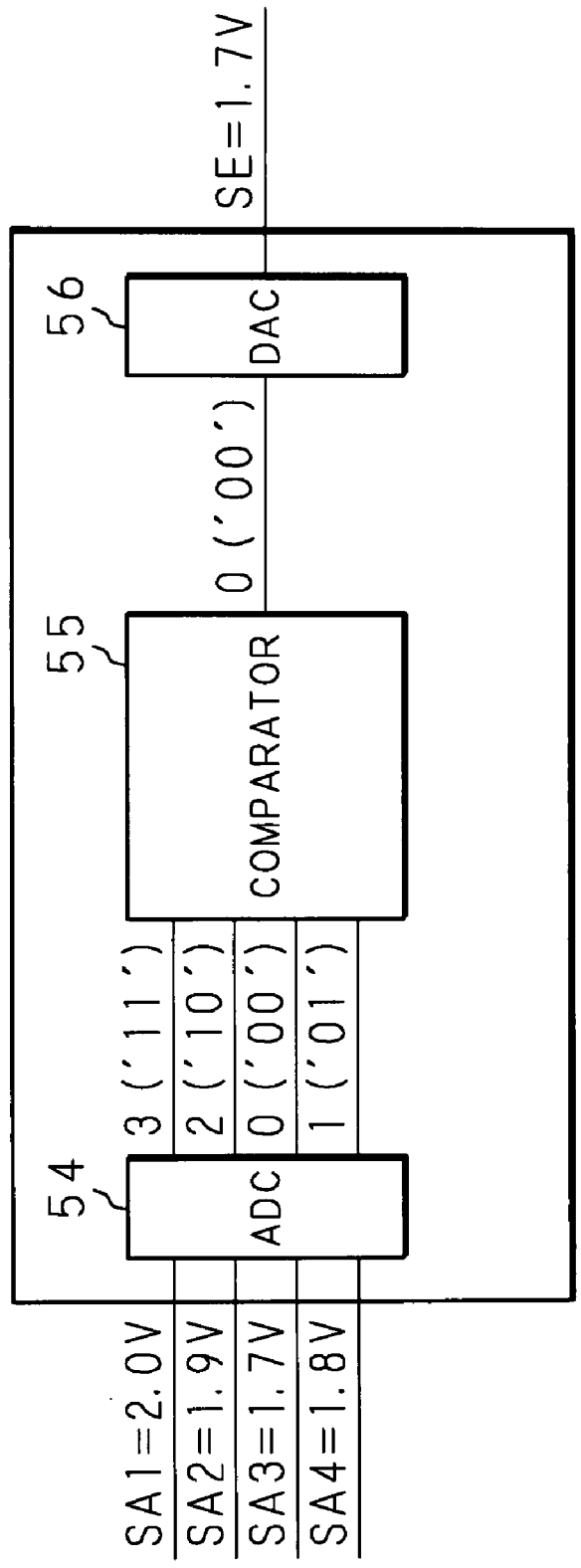
FIG. 10 is a configuration diagram showing another exemplary specific configuration of the selection unit.

Note that the configuration of the selection unit 50 in each of the above-described embodiments is not limited to the one shown in FIG. 3. For example, as shown in a configuration diagram of FIG. 10 which shows another exemplary specific configuration of the selection unit, a selection unit 50 composed of an analog/digital converter (ADC) 54, a comparator 55, and a digital/analog converter (DAC) 56 may be used. The ADC 54 converts voltage signals in analog form into signals in digital form. As shown in FIG. 11A, the ADC 54 outputs output values associated with input voltages, respectively. The comparator 55 compares the digitized voltage signals based on a predetermined condition and selects one of the voltage signals, e.g., a voltage signal having the smallest value. The DAC 56 converts the voltage signal in digital form selected by the comparator 55 into a signal in analog form. As shown in FIG. 11B, the DAC 56 outputs an output voltage associated with an input value.

Accordingly, when voltage signals SA1, SA2, SA3, and SA4 are 2.0 V, 1.9 V, 1.7 V, and 1.8 V, respectively, the ADC 54 converts the voltage signals SA1, SA2, SA3, and SA4 into digital signals of 3 ('11'), 2 ('10'), 0 ('00'), and 1 ('01') so as to correspond to the respective voltages. Note that ('XX') represents a binary numeral. The comparator 55 then selects 0 ('00') which is the smallest value among 3 ('11'), 2('10'), 0 ('00'), and 1 ('01'). The DAC 56 then converts 0 ('00') into an analog signal having a signal level of 1.7 V. By this, a signal SE having a signal level of 1.7 V which is the lowest voltage among the voltage signals SA1, SA2, SA3, and SA4 is outputted from the selection unit 50.

In the selection unit 50 having the above-described configuration, since the voltage signals SA1, SA2, SA3, and SA4 are digitized by the ADC 54 and a signal having the smallest value among the digitized signals is converted into a signal in analog form by the DAC 56, there is a possibility that some error may occur between a signal SE and the lowest voltage among the voltage signals SA1, SA2, SA3, and SA4.

Figure 12:
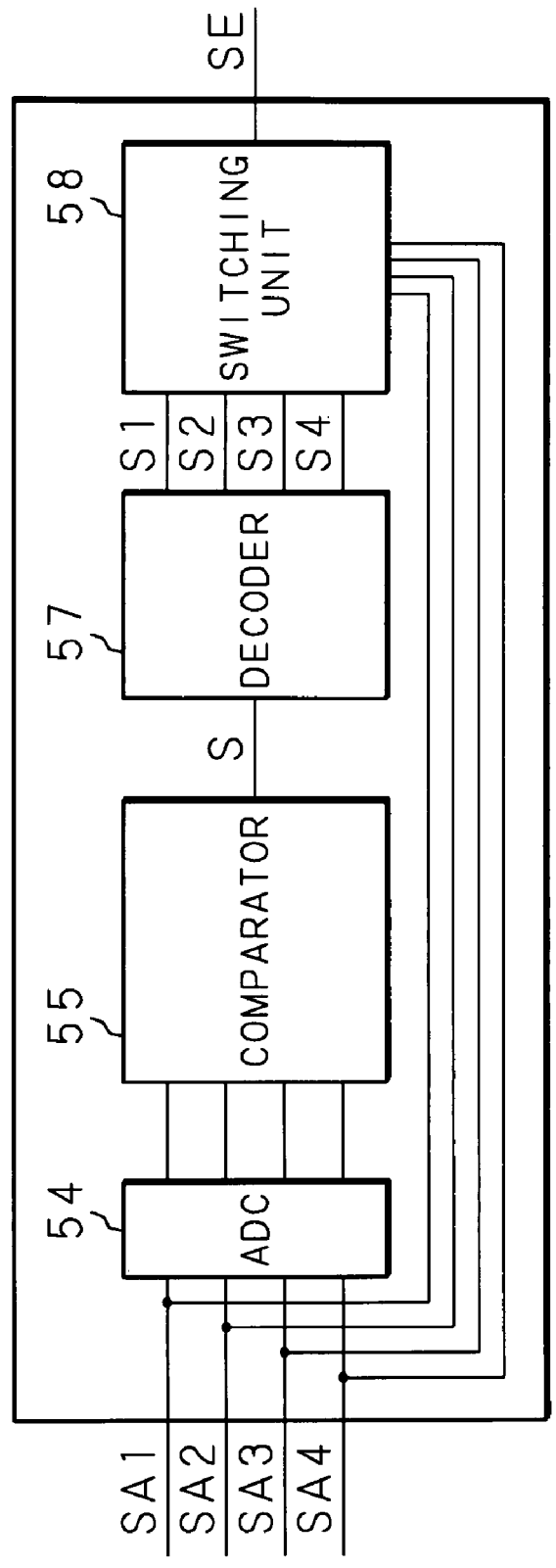
FIG. 12 is a configuration diagram showing still another exemplary specific configuration of the selection unit.

In view of this, as shown in a configuration diagram of FIG. 12 which shows still another exemplary specific configuration of the selection unit, the selection unit 50 may be composed of an ADC 54, a comparator 55, a decoder 57, and a switching unit 58. The decoder 57 receives a signal S outputted from the comparator 55 and decodes the signal S, and thereby, generates signals S1, S2, S3, and S4 corresponding to channels, respectively, and outputs them to the switching unit 58. Based on the signals S1, S2, S3, and S4, the switching unit 58 selects and outputs voltage signals SA1, SA2, SA3, and SA4.

Figure 13:
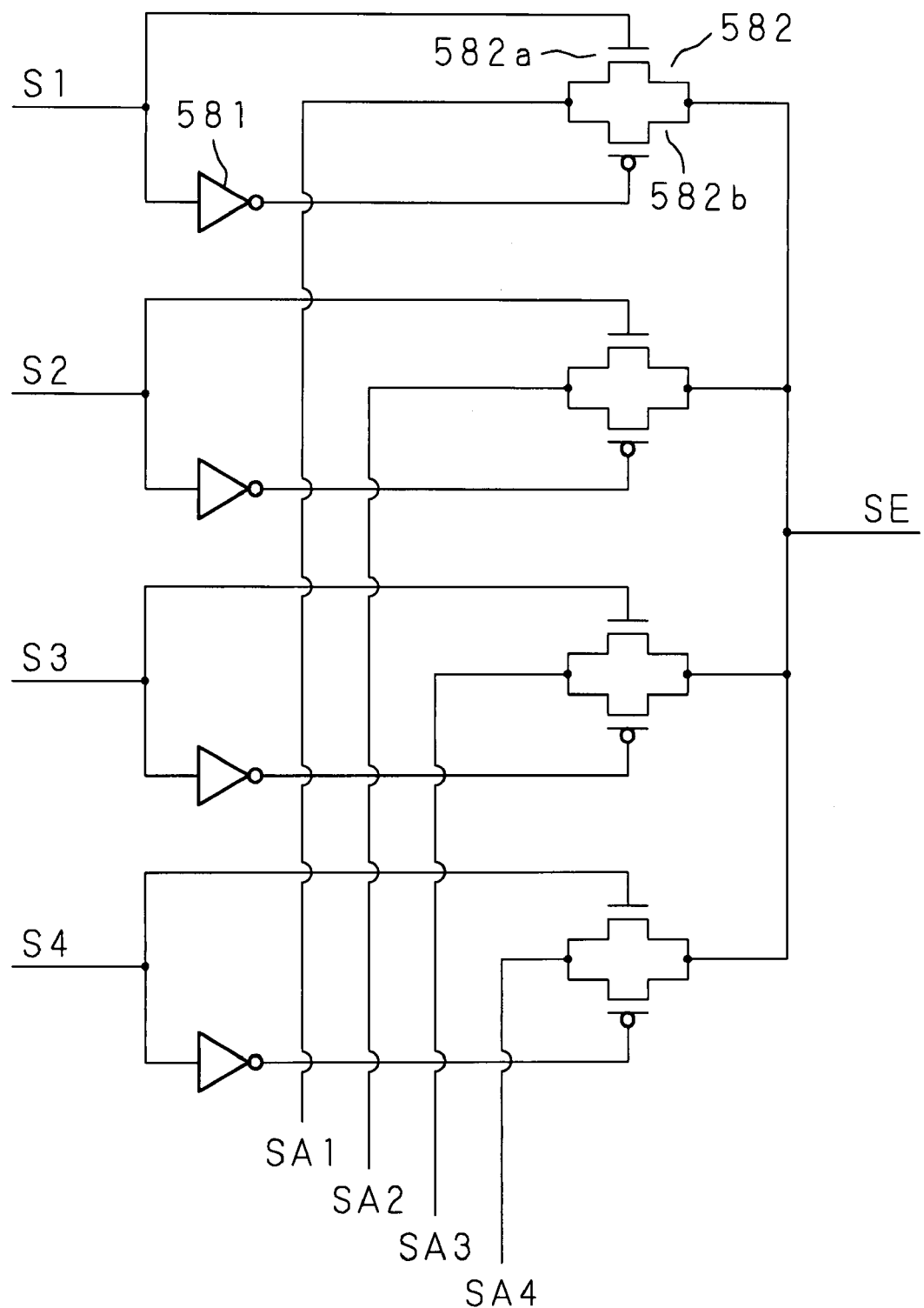
FIG. 13 is a configuration diagram showing an exemplary specific configuration of a switching unit.

FIG. 13 is a configuration diagram showing an exemplary specific configuration of the above-described switching unit 58. Specifically, as shown in FIG. 13, the switching unit 58 includes inverters 581 and analog switches 582 each composed of an N-channel transistor 582a and a P-channel transistor 582b, so as to correspond to voltage signals SA1, SA2, SA3, and SA4, respectively. A signal S1 (S2, S3, or S4) is inputted to a gate of its corresponding N-channel transistor 582a and an inverted signal obtained by inverting the signal S1 (S2, S3, or S4) using its corresponding inverter 581 is inputted to a gate of its corresponding P-channel transistor 582b. The voltage signal SA1 (SA2, SA3, or SA4) is inputted to sources of its corresponding N-channel transistor 582a and P-channel transistor 582b. By this, when the signal S1 (S2, S3, or S4) is high level, both of the N-channel transistor 582a and the P-channel transistor 582b go into an ON state; on the other hand, when the signal S1 (S2, S3, or S4) is low level, both of the N-channel transistor 582a and the P-channel transistor 582b go into an OFF state. Thus, a voltage signal corresponding to the high level signal S1 (S2, S3, or S4) is selected and outputted from the switching unit 58 as a signal SE.

Since the switching unit 58 selects any of the voltage signals SA1, SA2, SA3, and SA4 based on the signals S1, S2, S3, and S4, an error that occurs when the DAC 56 is used does not occur and the signal level of a signal SE becomes the lowest level among the actual voltage signals SA1, SA2, SA3, and SA4. Hence, by proving the switching unit 58, the accuracy of the signal level of a signal SE is further improved as compared with the case in which the DAC 56 is used. Accordingly, feedback control, by the source voltage supplying unit 30, of a supply voltage to the function unit 20 is improved.

Note that the present invention is not limited to the above-described embodiments. For example, a configuration may be such that the control unit 10, the excluding unit 40 or 60, the selection unit 50, and the source switching unit 90 are mounted on the function unit 20 or 70 or the source voltage supplying unit 30 or 80.

Embodiment 6

Figure 14:
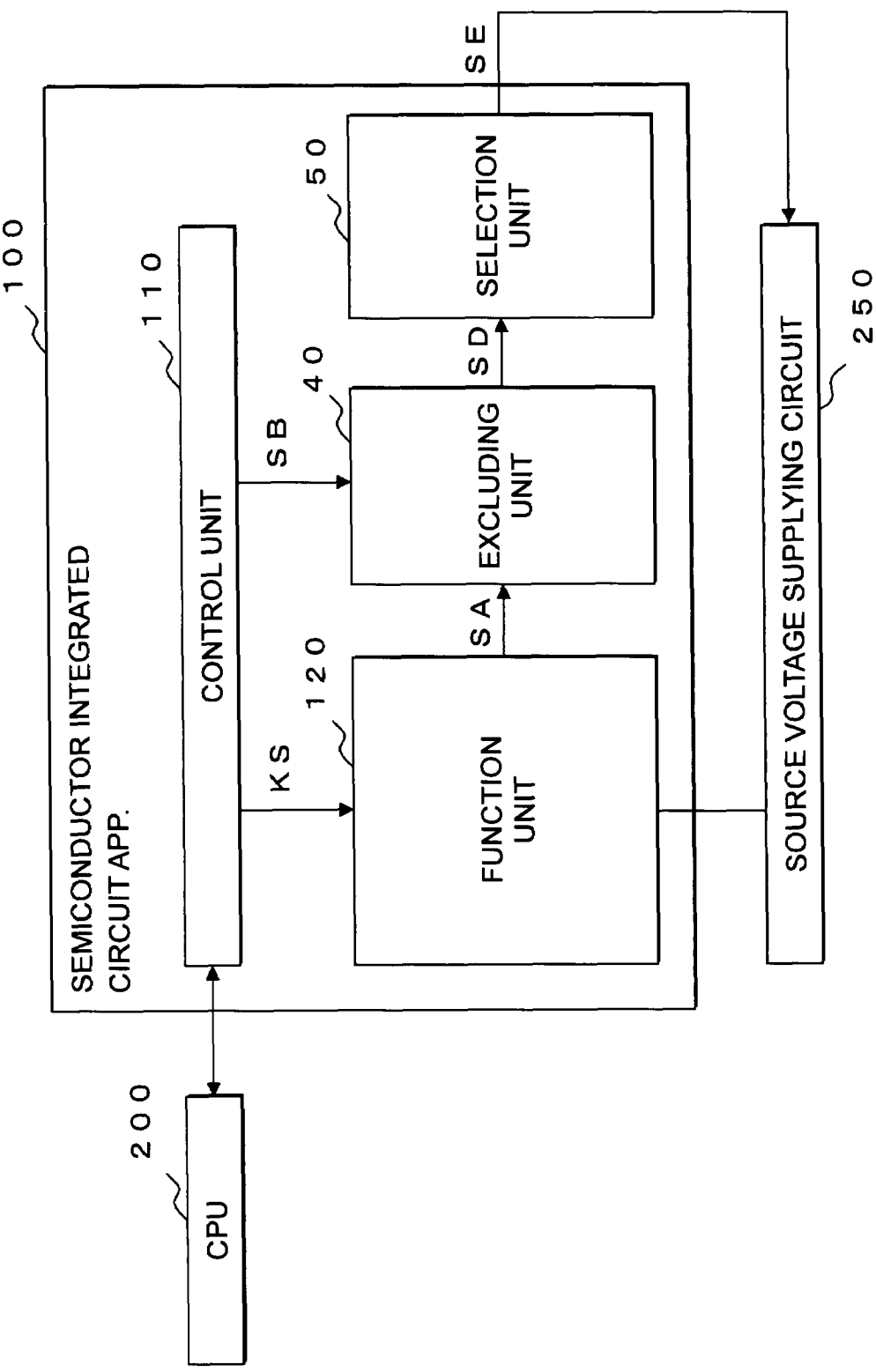
FIG. 14 is a block diagram showing one configuration example of a source voltage supply control system according to an Embodiment 6 of the present invention.

FIG. 14 is a block diagram showing one configuration example of a source voltage supply control system according to an Embodiment 6 of the present invention. The source voltage supply control system according to the Embodiment 6 comprises: a semiconductor integrated circuit apparatus 100 which is configured by a function unit 120, an excluding unit 40, a selection unit 50 and a control unit 110 as an integrated circuit; a CPU 200 for specifying the operation of the semiconductor integrated circuit apparatus 100; and a source voltage supplying circuit 250 for supplying a source voltage to the semiconductor integrated circuit apparatus 100.

The source voltage supplying circuit 250 has the substantially same function as that of the source voltage supply unit 30 of the semiconductor integrated circuit apparatus according to the Embodiment 1. Similarly, the excluding unit 40 and the selection unit 50 of the semiconductor integrated circuit apparatus 100 have the substantially same function as the excluding unit 40 and the selection unit 50 of the semiconductor integrated circuit apparatus according to the Embodiment 1. The CPU 200 can communicate with the control unit 110 of the semiconductor integrated circuit apparatus 100 and controls the operation of the semiconductor integrated circuit apparatus 100 by applying various kinds of orders to the control unit 110. The control unit 110 controls the ON/OFF of the switches 41a, 41b, 41c and 41d in the excluding unit 40 by outputting a control signal SB to the excluding unit 40 based on the order from the CPU 200, and switches the supply/non-supply of the source voltage to the plurality of circuit blocks in the function unit 120 by outputting a control signal KS to the function unit 120.

Figure 15:
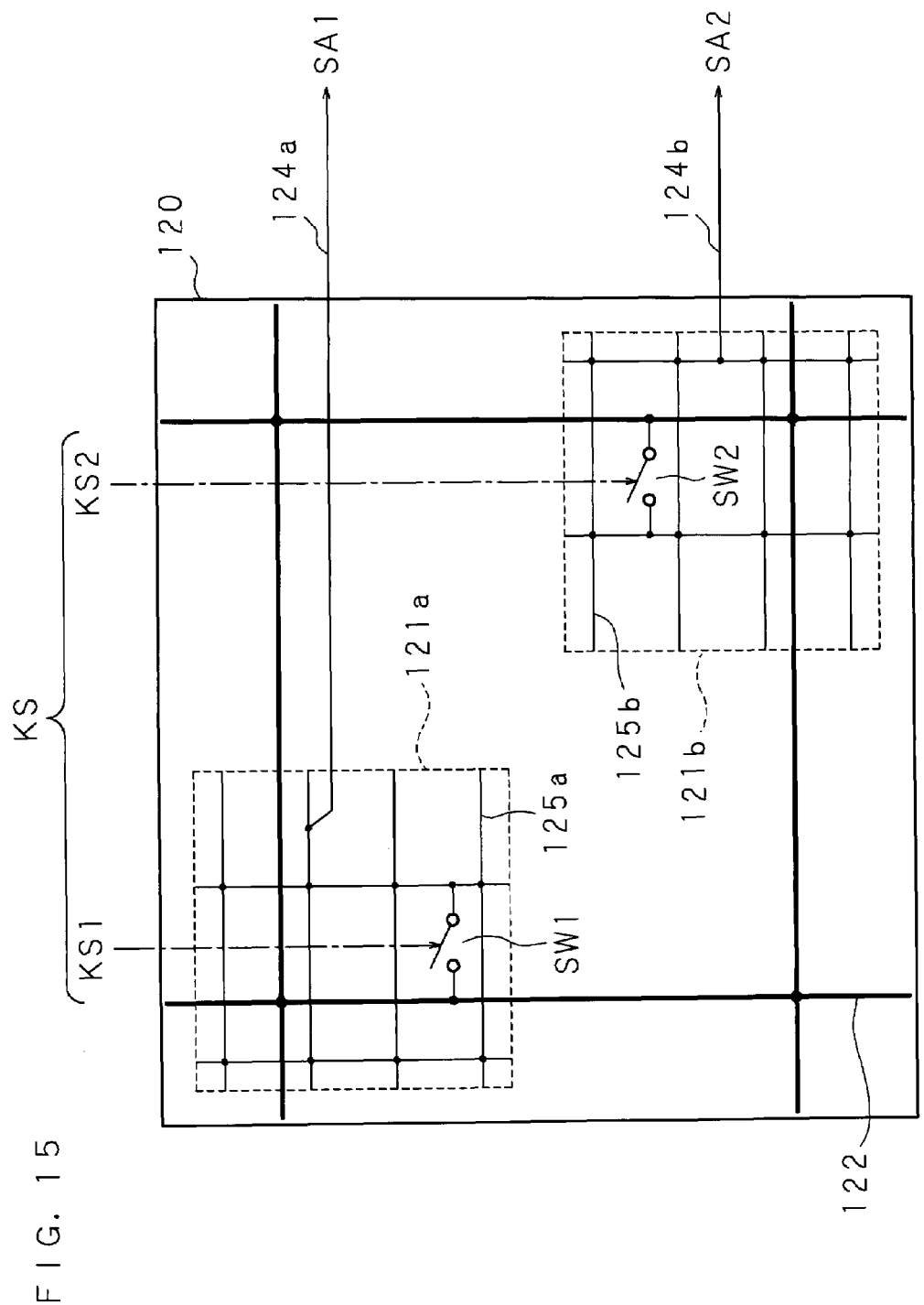
FIG. 15 is a schematic view showing one configuration example of the function unit.

FIG. 15 is a schematic view showing one configuration example of the function unit 120. The function unit 120 comprises a plurality of circuit blocks 121a and 121b. A source line 122 for supplying a source voltage to each circuit block 121a and 121b is wired in a mesh pattern.

The circuit block 121a (121b) is configured by a plurality of circuit elements (not shown) and an in-block source line 125a (125b) for supplying a source voltage to each circuit element is wired in a mesh pattern. The in-block source line 125a (125b) is finely provided as compared with the source line 122, and can connect to the source line 122 through a switch SW1 (SW2).

The control signals KS1 and KS2 for controlling the ON/OFF of the switches SW1 and SW2 provided in the circuit blocks 121a and 121b, respectively are given from the control unit 110. It is to be noted that the plural control signals KS1 and KS2 are put together into one control signal KS in FIG. 14. The control unit 110 controls the ON/OFF of the switches SW1 and SW2 by the control signals KS1 and KS2, so that it can control the supply/non-supply of the source voltage from the source voltage supplying circuit 250 to the circuit blocks 121a and 121b.

In addition, a leader wiring 124a (124b) is connected to the in-block source line 125a (125b) of the circuit block 121a (121b), and the voltage of the in-block source line 125a (125b) is outputted as a voltage signal SA1 (SA2). The voltage signal SA1 (SA2) outputted from the circuit block 121a (121b) is applied to the excluding unit 40. In addition, the plural voltage signals SA1 and SA2 are put together into one voltage signal SA in FIG. 14. The excluding unit 40 has the same configuration as that of the excluding unit according to the Embodiment 1 shown in FIG. 2, for example. Therefore, according to the control signal SB given from the control unit 110, the excluding unit 40 outputs the inputted several voltage signals SA such as the SA1 and SA2 to the selection unit 50 as it is and does not output the remaining several voltage signals SA but outputs a voltage VMAX higher than the source voltage supplied to each circuit block 121a (121b), to the selection unit 50 as an output signal SD.

The CPU 200 gives orders to turn ON/OFF the operation of the circuit blocks 121a and 121b of the function unit 120 to the control unit 110, for example. When the order to turn off the operation of any one of the circuit block 121a and 121b is given, the control unit 110 outputs the control signal KS1 or KS2 to supply the source voltage by turning on the switch SW1 or SW2 of the corresponding circuit block 121a or 121b, and outputs the control signal SB so that the excluding unit 40 gives the voltage signals SA1 or SA2 outputted from the corresponding circuit block 121a or 121b to the selection unit 50. In addition, when the order to turn off the operation of any one of the circuit block 121a and 121b is given, the control unit 110 outputs the control signal KS1 or KS2 so as not to supply the source voltage by turning off the switch SW1 or SW2 of the corresponding circuit block 121a or 121b, and outputs the control signal SB to the excluding unit 40 so that the excluding unit 40 excludes the voltage signals SA1 or SA2 outputted from the corresponding circuit block 121a or 121b.

In addition, as another configuration example, the CPU 200 may give orders to turn ON/OFF the switches SW1 and SW2 of the circuit blocks 121a and 121b, respectively and give orders to specify the exclusion of the voltage signals SA1 and SA2 by the excluding unit 40, to the control unit 110. Since the CPU 200 gives orders to operate each of the circuit blocks 121a and 121b of the function unit 120 to the control unit 110, it can easily grasp whether it is necessary to supply the source voltage to each of the circuit blocks 121a and 121b or not, and whether the source voltage is supplied or not. Therefore, the CPU 200 can easily generate the orders to turn ON/OFF the switches SW1 and SW2 and to specify the exclusion of the voltage signals SA1 and SA2 and gives them to the control unit 110.

According to the source voltage supply control system according to the Embodiment 6 having the above configuration, since the switches SW1 and SW2 are provided in the circuit blocks 121a and 121b, respectively that constitute the selection unit 120 of the semiconductor integrated circuit apparatus 100, the supply/non-supply of the source voltage can be switched. Therefore, since the source voltage is not supplied to the circuit block 121a or 121b that does not operate, power consumption can be saved. At the same time, in the configuration, the control unit 110 or the CPU 200 gives the control signal SB to the excluding unit 40 in which the voltage signal SA1 or SA2 outputted from the circuit blocks 121a or 121b to which the source voltage is not supplied is excluded. Therefore, since a high source voltage is not supplied to the circuit block 121a or 121b that does not operate because of the determination that a voltage drop is generated, it is prevented that the source voltage supplied to the other circuit block 121a or 121b becomes too high and the problem is generated.

Variation of Embodiment 6

Figure 16:
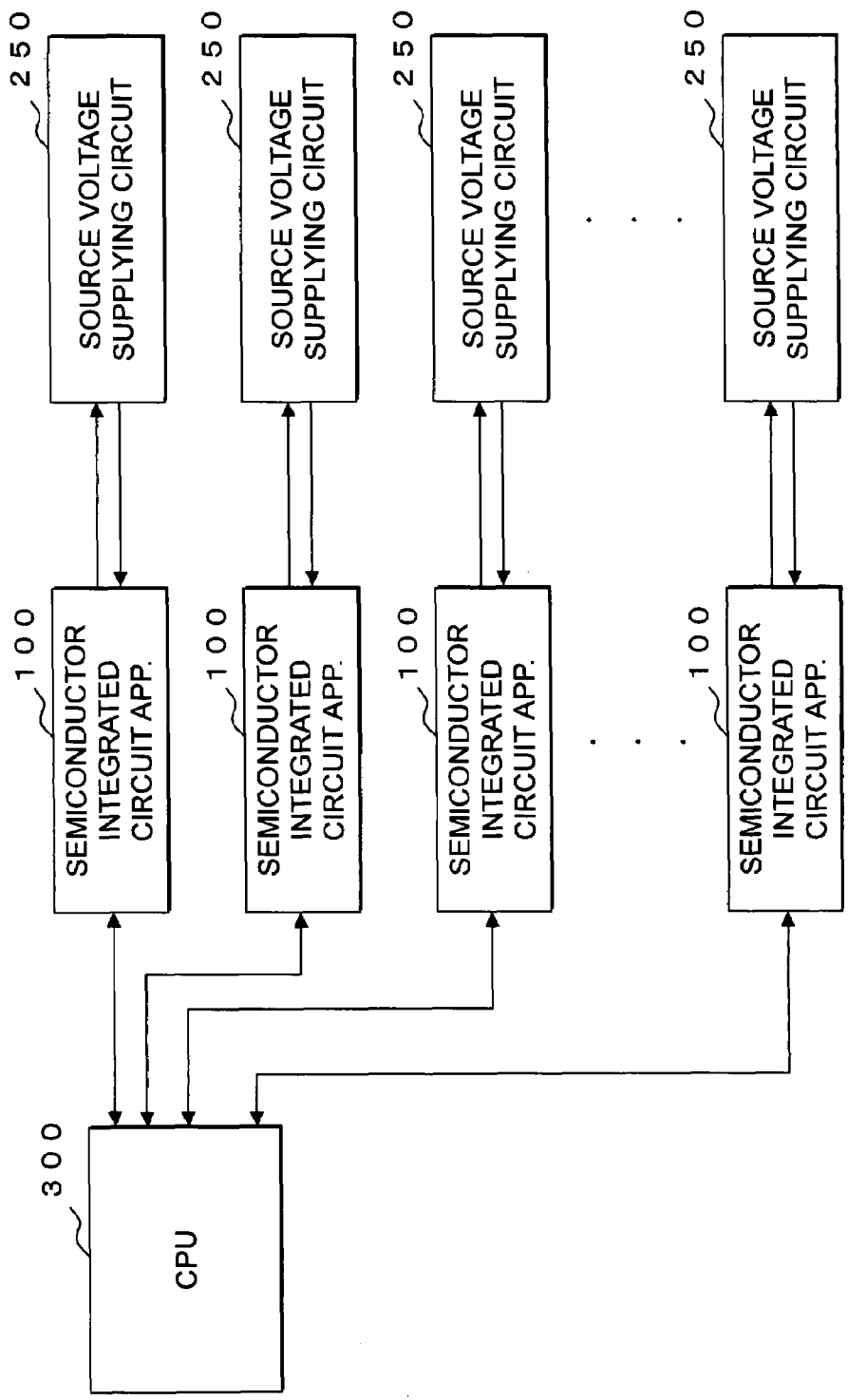
FIG. 16 is a block diagrams showing a configuration example of a source voltage supply control system according to a variation of the Embodiment 6 of the present invention.

FIG. 16 is a block diagrams showing the configuration example of a source voltage supply control system according to a variation of the Embodiment 6 of the present invention. Although the CPU 200 controls one semiconductor integrated circuit apparatus 100 in the above source voltage supply control system shown in FIG. 14, a CPU 300 controls a plurality of semiconductor integrated circuit apparatus 100 in the source voltage supply control system according to the variation of the Embodiment 6.

The source voltage supply control system according to the variation of the Embodiment 6 comprises a plurality of semiconductor integrated circuit apparatus 100 and source voltage supplying circuits 250 having the same number as that of the semiconductor integrated circuit apparatus 100 and supplying source voltages to the semiconductor integrated circuit apparatus 100. In addition, a CPU 300 that can communicate with the plurality of semiconductor integrated circuit apparatus 100 is provided. When the CPU 300 gives orders to a control unit 110 of each semiconductor integrated circuit apparatus 100, the supply/non-supply of the source voltage to a plurality of circuit blocks 121a and 121b that constitute a function unit 120 of the semiconductor integrated circuit apparatus 100 can be switched.

Thus, the source voltage supply control system according to the Embodiment 6 may have the configuration in which one CPU 300 gives orders to the plurality of semiconductor integrated circuit apparatus 100. In this case, since the plurality of semiconductor integrated circuit apparatus 100 can be centralized controlled, the system can be simplified.

Embodiment 7

Figure 17:
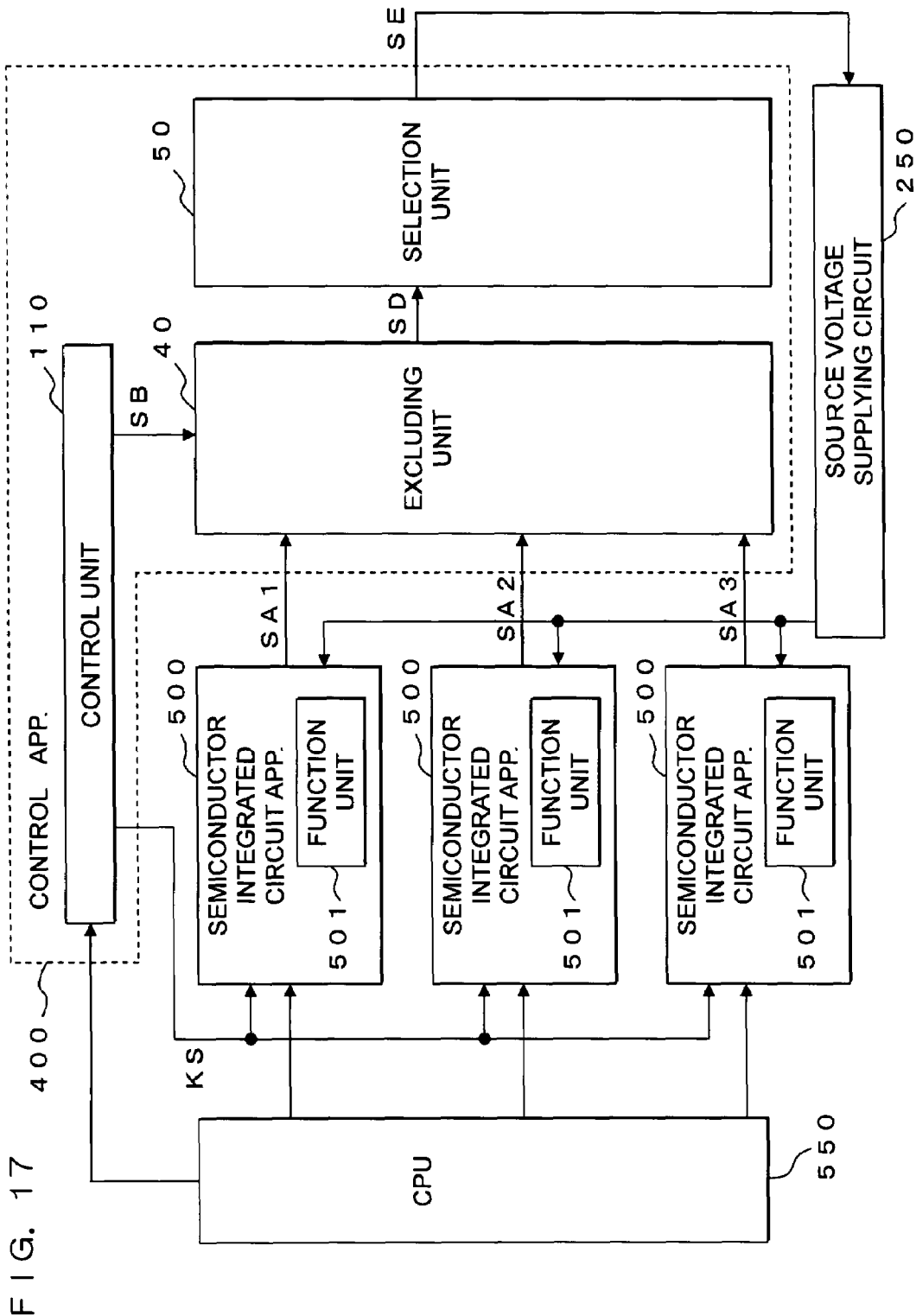
FIG. 17 is a block diagram showing one configuration example of a source voltage supply control system according to an Embodiment 7 of the present invention.

FIG. 17 is a block diagram showing one configuration example of a source voltage supply control system according to an Embodiment 7 of the present invention. The source voltage supply control system according to the Embodiment 7 is constituted such that one CPU 550 gives orders to a plurality of semiconductor integrated circuit apparatus 500 similar to the source voltage supply control system according to the Embodiment 6.

The source voltage supply control system according to the Embodiment 7 comprises: the plurality of semiconductor integrated circuit apparatus 500; one source voltage supplying circuit 250 to supply a source voltage to all the semiconductor integrated circuit apparatus 500; a control apparatus 400 for controlling the voltage value of the source voltage supplied from the source voltage supplying circuit 250; and the CPU 550 for giving various kinds of orders to each semiconductor integrated circuit 500 apparatus and the control apparatus 400 to operate them. It is to be noted that the semiconductor integrated circuit apparatus 500 is different from the semiconductor integrated circuit apparatus 100 according to the Embodiment 6 in that each semiconductor integrated circuit apparatus 500 does not have a control unit 110, an excluding unit 40, or a selection unit 50, but has a function unit 501 only.

The control unit 110, the excluding unit 40 and the selection unit 50 are provided in the control apparatus 400. Meanwhile, the voltage values at the predetermined positions of source wirings provided in the function units 501 of each semiconductor integrated circuit apparatus 500 are given from the semiconductor integrated circuit apparatus 500 to the excluding unit 40 as voltage signals SA1, SA2 and SA3. According to the order given from the CPU 550, the control unit 110 of the control apparatus 400 generates a control signal KS to switch the supply/non-supply of the source voltage from the source voltage supplying circuit 250 to the function units 501 of the semiconductor integrated circuit apparatus 500, and gives it to the semiconductor integrated circuit apparatus 500. In addition, according to the order given from the CPU 550, the control unit 110 generates a control signal SB to exclude one or more of the voltage signals SA1, SA2 and SA3 among the voltage signals SA1, SA2 and SA3 outputted form the semiconductor integrated circuit apparatus 500 to be given to the selection unit 50, and gives it to the excluding unit 40.

According to the source voltage supply control system in the Embodiment 7 having the above configuration, it is not necessary to provide the control unit 110, the excluding unit 40 and the selection unit 50 in each semiconductor integrated circuit apparatus 500, and one source voltage supplying circuit 250 can supply the source voltage to the plurality of semiconductor integrated circuit apparatus 500. Therefore, the source voltage supply control system according to the Embodiment 7 has advantages that its system scale is small and low cost and miniaturization can be implemented.

Embodiment 8

Figure 18:
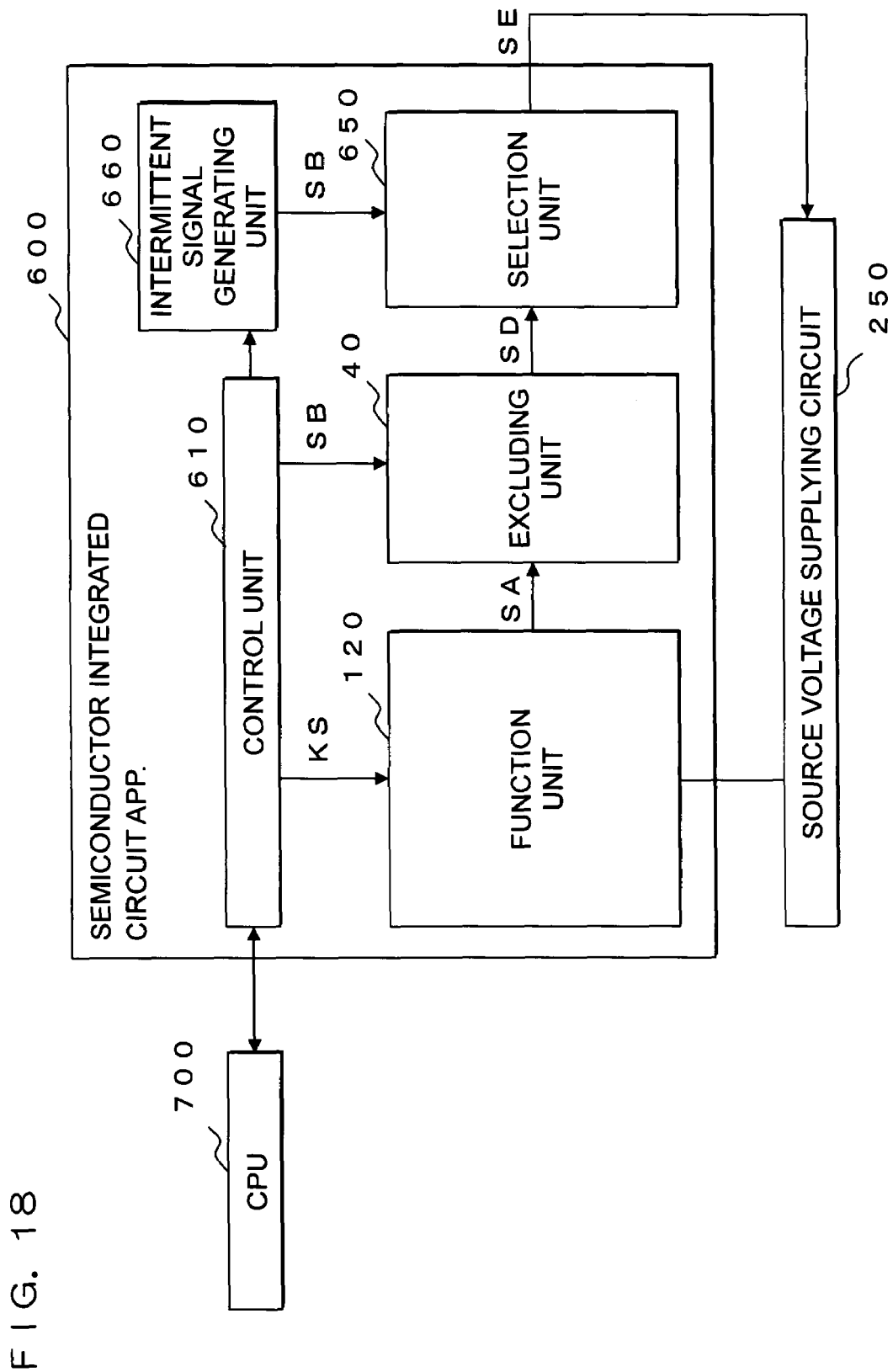
FIG. 18 is a block diagram showing one configuration example of a source voltage supply control system according to an Embodiment 8 of the present invention.

FIG. 18 is a block diagram showing one configuration example of a source voltage supply control system according to an Embodiment 8 of the present invention. The source voltage supply control system according to the Embodiment 8 is constituted such that an intermittent signal generating unit 660 is added to the semiconductor integrated circuit apparatus 600 of the source voltage supply control system according to the Embodiment 6.

The intermittent signal generating unit 660 provided in the semiconductor integrated circuit apparatus 600 generates an intermittent signal TL according to a control signal given from a control unit 610 and outputs it to a selection unit 650. The control unit 610 controls the operations of a function unit 120, an excluding unit 40 and the intermittent signal generating unit 660 according to the orders given from a CPU 700.

For example, the control unit 610 activates the intermittent signal generating unit 660 and starts to output the intermittent signal TL when the order to start the intermittent operation is given from the CPU 700, and controls the intermittent signal generating unit 660 such that the intermittent signal generating unit 660 stops outputting the intermittent signal TL when the order to stop the intermittent operation is given.

Figure 19:
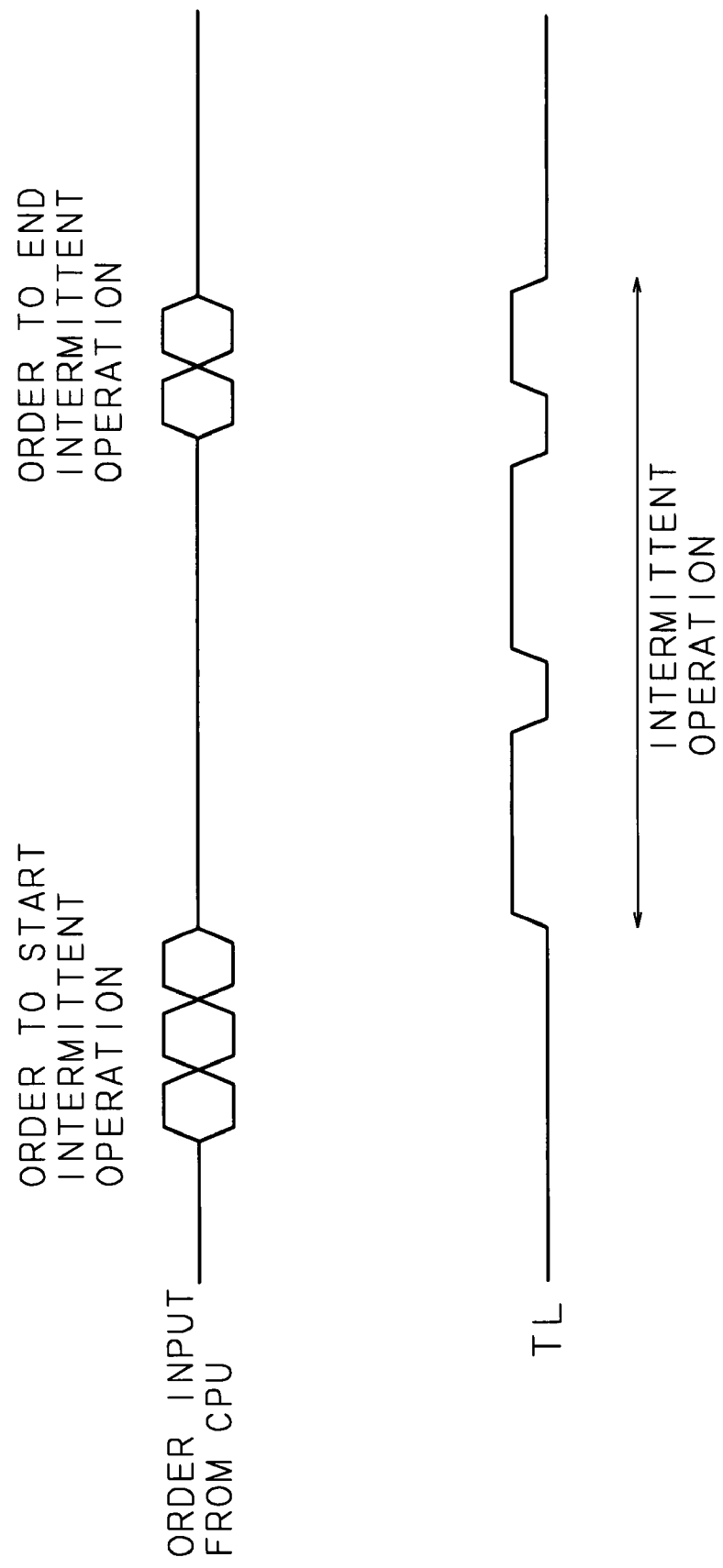
FIG. 19 is a timing chart showing the operation of a intermittent signal generating unit in the source voltage supply control system according to the Embodiment 8.

FIG. 19 is a timing chart showing the operation of the intermittent signal generating unit 660 in the source voltage supply control system according to the Embodiment 8. For example, when the control unit 610 accepts the order to start the 3-cycle intermittent operation from the CPU 700, the operation of the intermittent signal generating unit 660 is started and the intermittent signal TL is outputted. The intermittent signal TL is generated using a timer (not shown) and repeats H level and L level during a predetermine period. The selection unit 650 is constituted such that it performs a selecting operation when the intermittent signal TL is at H level and does not perform the selecting operation when the intermittent signal TL is at L level. In addition, when the control unit 610 accepts the order to end the intermittent operation of 2-cycle from the CPU 700, the operation of the intermittent signal generating unit 660 is stopped. In this case, the intermittent signal TL is fixed to L level and as a result, the selecting operation of the selection unit 650 is stopped.

Figure 20:
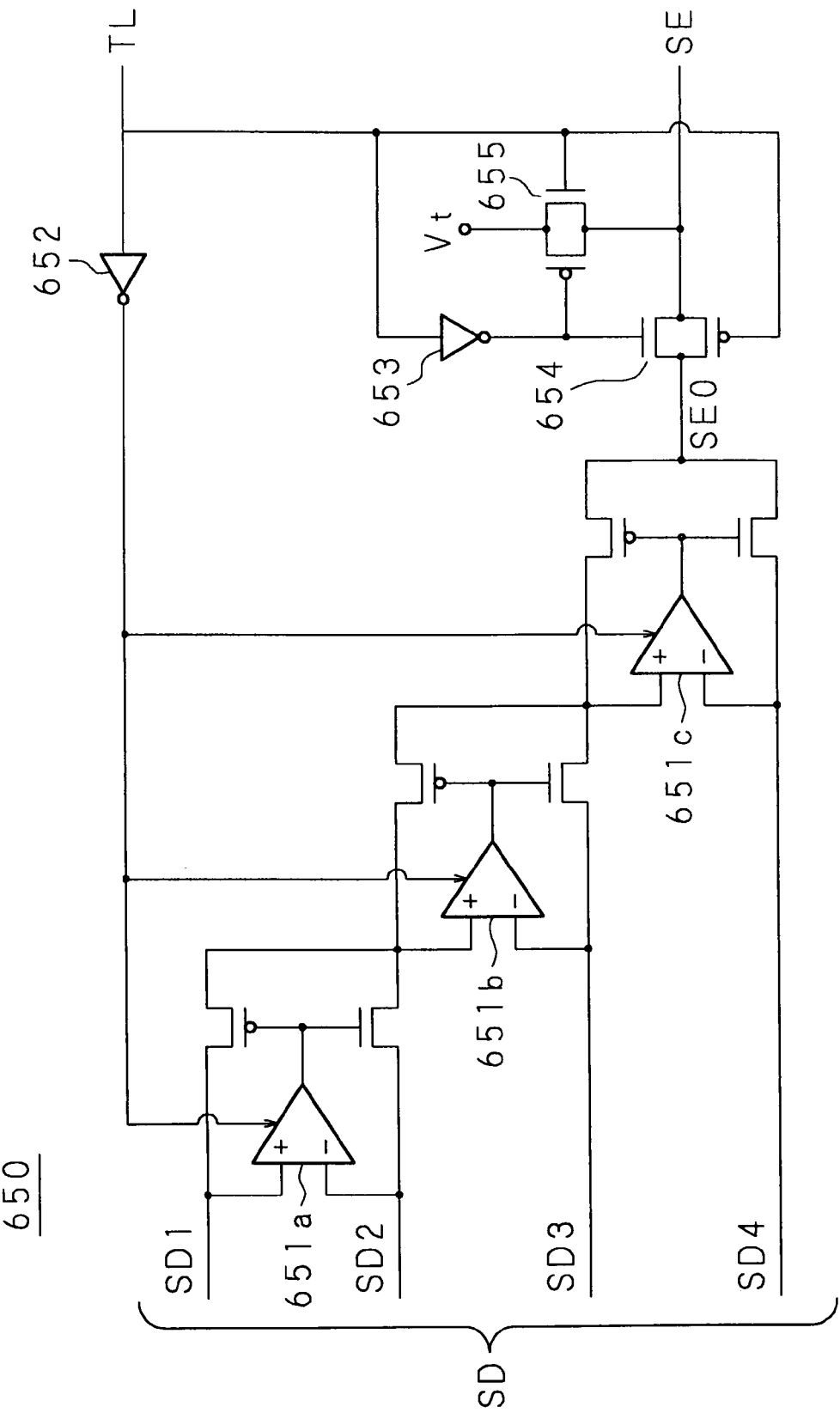
FIG. 20 is a circuit diagram showing the configuration example of the selection unit of the source voltage supply control system according to the Embodiment 8 of the present invention.

FIG. 20 is a circuit diagram showing the configuration example of the selection unit 650 of the source voltage supply control system according to the Embodiment 8 of the present invention. In addition, FIG. 20 shows a case where four signals SD1, SD2, SD3 and SD4 are outputted from the excluding unit 40, as one example. In addition, the four signals SD1, SD2, SD3 and SD4 outputted from the excluding unit 40 to the selection unit 650 are put together into one signal SD in FIG. 19.

In the selection unit 650 of the source voltage supply control system according to the Embodiment 8, the function of the selection unit 50 of the semiconductor integrated circuit apparatus according to the Embodiment 1 is expanded so as to perform the intermittent operation according to the intermittent signal TL. The selection unit 650 is constituted such that it compares the voltages of the signals SD1, SD2, SD3 and SD4 using three comparators 651$a$, 651$b$ and 651$c$ and selects the signal having a minimum voltage value as a signal SE0. In addition, a control signal inverted from the intermittent signal TL by an inverter 652 is inputted to each of the comparators 651$a$, 651$b$ and 651$c$. When the control signal is at H level, the comparators 651$a$, 651$b$ ad 651$c$ do not operate, and when the control signal is at L level the comparators 651$a$, 651$b$ and 651$c$ operate.

Furthermore, the selection unit 650 is constituted to output the signal SE0 or a predetermined voltage Vt as the signal SE. More specifically, the signal SE0 selected by the comparators 651$a$, 651$b$ and 651$c$ is connected to an output end from which the signal SE is outputted, through a switching circuit 654, and the predetermine voltage Vt generated by a constant voltage generator circuit and the like is also connected to the output end from which the signal SE is outputted through a switching circuit 655. The switching circuits 654 and 655 are transfer gates combining an N channel transistor and a P channel transistor, respectively. The intermittent signal TL is inputted to the gate of the P channel transistor of the switching circuit 654 and the gate of the N channel transistor of the switching circuit 655, and the signal generated by inverting the intermittent signal TL by the inverter 653 is inputted to the gate of the N channel transistor of the switching circuit 654 and the gate of the P channel transistor of the witching circuit 655. Therefore, only one of the switching circuits 654 and 655 is turned on and the other is turned off.

As described above, when the intermittent signal TL is at H level, the comparators 651a, 651b and 651c operate to select one signal SE0 from the four signals SD1, SD2, SD3 and SD4, and the switching circuit 654 is turned on, whereby the signal is outputted as the signal SE. Meanwhile, when the intermittent signal TL is at L level, the comparators 651a, 651b and 651c do not operate and the switching circuit 655 is turned on, wherein the predetermined voltage Vt is outputted as the signal SE. The predetermined voltage Vt may have any voltage value as long as it can be distinguished from the selected signal SE0. The source voltage supplying circuit 250 supplies the source voltage to the function unit 120 without any limitation when the predetermined voltage Vt is inputted, but it adjusts the source voltage value to be given to the function unit 120 according to the inputted voltage value when the voltage other than the predetermined voltage Vt, that is, the signal SE0 is inputted.

According to the source voltage supply control system in the Embodiment 8 having the above configuration, since the selection unit 650 performs the selecting operation according to the intermittent signal TL outputted from the intermittent signal generating unit 660, there is an advantage that the power consumption accompanied by the operation of the selection unit 650 can be saved. In addition, the intermittent operation may be performed by the other circuits, the excluding unit 40, for example using the intermittent signal TL as well as the selection unit 650. In this case, the power consumption can be more saved.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds there-of are therefore intended to be embraced by the claims.

What is claimed is:

1. A control apparatus for detecting voltages at a plurality of positions on an integrated circuit and controlling a supply voltage to be supplied to said integrated circuit, based on the detected voltages, comprising:
    selecting means for selecting a voltage at one position of said plurality of positions; and
    excluding signal generating means for generating an excluding signal which excludes said voltage at one position of said plurality of positions from the selection made by said selecting means;
    wherein said selecting means selects a second voltage from voltages not excluded by said excluding signal, and
    the supply voltage to be supplied to said integrated circuit is controlled based on said second voltage selected by said selecting means.

2. The control apparatus as set forth in claim 1, wherein said selecting means selects a lowest voltage from the voltages not excluded by the excluding signal.

3. The control apparatus as set forth in claim 1, further comprising identifying means for identifying the position of the voltage excluded from the selection by said selecting means,
    wherein said excluding signal generating means generates the excluding signal for excluding the voltage at the position identified by said identifying means.

4. The control apparatus as set forth in claim 3, wherein said selecting means selects a lowest voltage from the voltages not excluded by the excluding signal.

5. The control apparatus as set forth in claim 3, wherein said identifying means identifies the position of the voltage excluded from the selection by said selecting means, based on an operation of each of the plurality of positions on said integrated circuit.

6. The control apparatus as set forth in claim 5, wherein said selecting means selects a lowest voltage from the voltages not excluded by the excluding signal.

7. The control apparatus as set forth in claim 3, wherein said identifying means identifies the position of the voltage excluded from the selection by said selecting means, based on results of comparison between the voltages at the plurality of positions on said integrated circuit and a reference voltage.

8. The control apparatus as set forth in claim 7, wherein said selecting means selects a lowest voltage from the voltages not excluded by the excluding signal.

9. The control apparatus as set forth in claim 3, wherein
    said integrated circuit has a plurality of circuit blocks each including one of said plurality of positions,
    switching means for switching supply/non-supply of the voltage to each circuit block is provided, and
    said identifying means identifies a position of one or more circuit blocks to which the voltage is not supplied by said switching means as a position corresponding to the voltage excluded from the selection made by said selecting means.

10. A control apparatus for detecting voltages at an optional position of each of a plurality of integrated circuits and controlling a supply voltage to be supplied to said plurality of integrated circuits, based on the detected voltages, comprising:
    selecting means for selecting a voltage among the voltages at each of the optional positions of said plurality of integrated circuits;
    switching means for switching supply/non-supply of the voltage to each of said plurality of integrated circuits; and
    excluding signal generating means for generating an excluding signal which excludes said voltage at the optional position of one or more of said plurality of integrated circuits to which voltage is not supplied by said switching means in said plurality of integrated circuits from the selection made by said selecting means;
    wherein said selecting means selects a second voltage from voltages not excluded by said excluding signal, and
    the supply voltage to be supplied to said plurality of integrated circuits is controlled based on said second voltage selected by said selecting means.

11. A semiconductor integrated circuit apparatus, comprising:
    an integrated circuit which is laid out on a board; and
    a control apparatus for detecting voltages at a plurality of positions on an integrated circuit and controlling a supply voltage to be supplied to said integrated circuit, based on the detected voltages;
    said control apparatus including:
    selecting means for selecting a voltage at one position of said plurality of positions; and
    excluding signal generating means for generating an excluding signal which excludes said voltage at one position of said plurality of positions from the selection made by said selecting means;
    wherein said selecting means selects a second voltage from voltages not excluded by said excluding signal, and
    the supply voltage to be supplied to said integrated circuit is controlled based on said second voltage selected by said selecting means.

12. The semiconductor integrated circuit apparatus as set forth in claim 11, wherein said selecting means selects a lowest voltage from the voltages not excluded by the excluding signal.

13. The semiconductor integrated circuit apparatus as set forth in claim 11, said control apparatus further including identifying means for identifying the position of the voltage excluded from the selection by said selecting means,
wherein said excluding signal generating means generates the excluding signal for excluding the voltage at the position identified by said identifying means.

14. The semiconductor integrated circuit apparatus as set forth in claim 13, wherein said selecting means selects a lowest voltage from the voltages not excluded by the excluding signal.

15. The semiconductor integrated circuit apparatus as set forth in claim 13, wherein said identifying means identifies the position of the voltage excluded from the selection by said selecting means, based on an operation of each of the plurality of positions on said integrated circuit.

16. The semiconductor integrated circuit apparatus as set forth in claim 15, wherein said selecting means selects a lowest voltage from the voltages not excluded by the excluding signal.

17. The semiconductor integrated circuit apparatus as set forth in claim 13, wherein said identifying means identifies the position of the voltage excluded from the selection by said selecting means, based on results of comparison between the voltages at the plurality of positions on said integrated circuit and a reference voltage.

18. The semiconductor integrated circuit apparatus as set forth in claim 17, wherein said selecting means selects a lowest voltage from the voltages not excluded by the excluding signal.

19. The semiconductor integrated circuit apparatus as set forth in claim 13, wherein
said integrated circuit has a plurality of circuit blocks each including one of said plurality of positions,
switching means for switching supply/non-supply of the voltage to each circuit block is provided, and
said identifying means identifies a position of one or more circuit blocks to which the voltage is not supplied by said switching means as a position corresponding to the voltage excluded from the selection made by said selecting means.

20. A source voltage supply control system including:
a semiconductor integrated circuit apparatus comprising:
a substrate on which an integrated circuit having a plurality of circuit blocks and switching means for switching supply/non-supply of a voltage to each circuit block is laid out; and
a control apparatus, arranged on said substrate, for detecting voltages at each of said circuit blocks of said integrated circuit and controlling a supply voltage to be supplied to each of said circuit blocks, based on the detected voltage, comprising: selecting means for selecting a voltage of one circuit block among said plurality of circuit blocks; identifying means for identifying one or more circuit blocks to which voltage is not supplied by said switching means; and excluding signal generating means for generating an excluding signal which excludes said voltage at one or more of said plurality of circuit blocks identified by said identifying means: wherein said selecting means selects a second voltage from voltages not excluded by said excluding signal, and the supply voltage to be supplied to said integrated circuit is controlled based on said second voltage selected by said selecting means;
a source voltage supplying device for supplying a voltage to said semiconductor integrated circuit apparatus; and
a specifying device for giving orders to specify the switching to switching means of said control apparatus of said semiconductor integrated circuit apparatus.

21. The source voltage supply control system as set forth in claim 20, wherein
said control apparatus has intermittent signal generating means for generating an intermittent signal whose value is intermittently varied,
said selecting means selects a circuit block according to said intermittent signal, and
said specifying device gives orders to specify switching of generation/non-generation of said intermittent signal, to said intermittent signal generating means of said control apparatus.

22. The source voltage supply control system as set forth in claim 20, further including:
a plurality of said semiconductor integrated circuit apparatus; and
a plurality of said source voltage supplying device for supplying voltage to each of said semiconductor integrated circuit apparatus,
wherein said specifying device gives orders to specify switching, to said switching means of each semiconductor integrated circuit apparatus.

23. The source voltage supply control system as set forth in claim 22, wherein
said control apparatus has intermittent signal generating means for generating an intermittent signal whose value is intermittently varied,
said selecting means selects a circuit block according to said intermittent signal, and
said specifying device gives orders to specify switching of generation/non-generation of said intermittent signal, to said intermittent signal generating means of said control apparatus.

24. A source voltage supply control system including:
a plurality of semiconductor integrated circuit apparatus on which a plurality of integrated circuits are laid out, respectively;
a control apparatus for detecting voltages at an optional position of each of a plurality of integrated circuits and controlling a supply voltage to be supplied to said plurality of integrated circuits, based on the detected voltages, comprising:
selecting means for selecting a voltage among the voltages at each of optional positions of said plurality of integrated circuits;
switching means for switching supply/non-supply of the voltage to each of said plurality of integrated circuits; and
excluding signal generating means for generating an excluding signal which excludes said voltage at the optional position of one or more of said plurality of integrated circuits to which voltage is not supplied by said switching means in said plurality of integrated circuits from the selection made by said selecting means;
wherein said selecting means selects a second voltage from voltages not excluded by said excluding signal, and the supply voltage to be supplied to said plurality of integrated circuits is controlled based on said second voltage selected by said selecting means;
a source voltage supplying device for supplying a voltage to said plurality of semiconductor integrated circuit apparatus; and
a specifying device for giving orders to specify switching, to said switching means of said control apparatus.

* * * * *